United States Patent
Sasaki et al.

(10) Patent No.: US 10,166,977 B2
(45) Date of Patent: Jan. 1, 2019

(54) CONTROL APPARATUS FOR VEHICLE-MOUNTED APPARATUS AND POWER STEERING APPARATUS

(71) Applicant: HITACHI AUTOMOTIVE SYSTEMS, LTD., Hitachinaka-shi, Ibaraki (JP)

(72) Inventors: Mitsuo Sasaki, Hadano (JP); Takumi Hisazumi, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 52 days.

(21) Appl. No.: 15/503,466

(22) PCT Filed: Aug. 6, 2015

(86) PCT No.: PCT/JP2015/072330
§ 371 (c)(1),
(2) Date: Feb. 13, 2017

(87) PCT Pub. No.: WO2016/047284
PCT Pub. Date: Mar. 31, 2016

(65) Prior Publication Data
US 2017/0240168 A1 Aug. 24, 2017

(30) Foreign Application Priority Data
Sep. 24, 2014 (JP) ................................. 2014-193904

(51) Int. Cl.
*B60W 30/045* (2012.01)
*B62D 5/04* (2006.01)
(Continued)

(52) U.S. Cl.
CPC ............. *B60W 30/045* (2013.01); *B60T 7/12* (2013.01); *B60T 11/21* (2013.01); *B60W 10/18* (2013.01);
(Continued)

(58) Field of Classification Search
CPC .... B60W 30/045; B60W 10/18; B60W 10/22; B60W 10/20; B60W 30/025;
(Continued)

(56) References Cited

U.S. PATENT DOCUMENTS

2008/0148847 A1* 6/2008 Sato .................. G01C 19/5607
73/504.12
2012/0031202 A1 2/2012 Goto et al.
(Continued)

FOREIGN PATENT DOCUMENTS

JP 2009-012511 A 1/2009
JP 2009051292 A * 3/2009
(Continued)

*Primary Examiner* — Tuan C To
(74) *Attorney, Agent, or Firm* — Foley & Lardner LLP

(57) ABSTRACT

One aspect of the present invention increases or reduces an amplitude or amplitudes of a steering angle sensor output signal and/or a motor rotational angle signal, and outputs a motor instruction signal based on a substitute signal for a torque sensor output signal that is calculated based on at least one of the steering angle sensor output signal and the motor rotational angle signal that is subjected to the adjustment of the amplitude thereof, and the other of the steering angle sensor output signal and the motor rotational angle signal, when an abnormality is detected in the torque sensor output signal.

7 Claims, 17 Drawing Sheets

(51) Int. Cl.
*B60W 10/20* (2006.01)
*B60W 30/02* (2012.01)
*B60W 10/18* (2012.01)
*B60W 10/22* (2006.01)
*B60T 7/12* (2006.01)
*B62D 6/10* (2006.01)
*B62D 15/02* (2006.01)
*B60T 11/21* (2006.01)

(52) U.S. Cl.
CPC ............ *B60W 10/20* (2013.01); *B60W 10/22* (2013.01); *B60W 30/025* (2013.01); *B62D 5/0409* (2013.01); *B62D 5/049* (2013.01); *B62D 5/0463* (2013.01); *B62D 6/10* (2013.01); *B62D 15/0235* (2013.01); *B60W 2510/202* (2013.01); *B60W 2540/18* (2013.01); *B60W 2710/18* (2013.01); *B60W 2710/20* (2013.01); *B60W 2710/202* (2013.01); *B60W 2710/22* (2013.01)

(58) Field of Classification Search
CPC ......... B60W 2710/18; B60W 2710/20; B60W 2710/22; B60W 2540/18; B60W 2710/202; B60W 2510/202; B60W 5/0409; B60T 7/12; B60T 11/21; B62D 5/0409; B62D 5/0463; B62D 5/049; B62D 6/10; B62D 15/0235
USPC .......................................................... 701/41
See application file for complete search history.

(56) References Cited

U.S. PATENT DOCUMENTS

| | | | | |
|---|---|---|---|---|
| 2012/0161833 | A1* | 6/2012 | Yoshida | G06F 15/78 327/156 |
| 2013/0099759 | A1* | 4/2013 | Ura | B62D 5/046 323/234 |
| 2013/0341109 | A1* | 12/2013 | Ozaki | B60L 3/0061 180/65.51 |
| 2014/0005894 | A1* | 1/2014 | Aoki | B62D 5/0484 701/43 |
| 2014/0081525 | A1* | 3/2014 | Itamoto | B62D 5/0484 701/42 |
| 2014/0350791 | A1* | 11/2014 | Matsushita | B62D 5/0481 701/41 |
| 2014/0358391 | A1* | 12/2014 | Kakihara | G01K 15/007 701/70 |
| 2014/0371992 | A1* | 12/2014 | Di Cairano | B62D 5/0463 701/42 |
| 2015/0015169 | A1* | 1/2015 | Yanagi | H02P 6/24 318/400.02 |
| 2015/0175193 | A1* | 6/2015 | Endo | B62D 5/0481 701/29.2 |
| 2015/0239494 | A1* | 8/2015 | Fukunaga | H04Q 9/00 701/43 |

FOREIGN PATENT DOCUMENTS

| | | | | |
|---|---|---|---|---|
| JP | 2009067222 A | * | 4/2009 | |
| JP | 2009269540 A | * | 11/2009 | ........... B62D 5/0484 |
| JP | 2010023657 A | * | 2/2010 | |
| WO | WO-2010/119958 A1 | | 10/2010 | |

* cited by examiner

CONTROL APPARATUS FOR VEHICLE-MOUNTED APPARATUS AND POWER STEERING APPARATUS

TECHNICAL FIELD

The present invention relates to a control apparatus for a vehicle-mounted apparatus, and a power steering apparatus.

BACKGROUND ART

As this kind of technique, there is disclosed a technique discussed in PTL 1, which will be listed below. PTL 1 discusses an electric power steering apparatus that controls a motor for providing a steering assist force to a steering mechanism according to a steering torque detected by a torque sensor. This electric power steering apparatus controls the motor with use of a detection value of a steering angle sensor that detects a rotational angle of a steering wheel, and a detection value of a motor rotational angle sensor that detects a rotational angle of a motor when an abnormality has occurred in the detection of the steering torque.

CITATION LIST

Patent Literature

PTL 1: Japanese Patent Application Public Disclosure No. 2009-012511

SUMMARY OF INVENTION

Technical Problem

The technique discussed in PTL 1 outputs a substitute signal for the torque sensor with use of the detection value of the steering angle sensor that detects the rotational angle of the steering wheel, and the detection value of the motor rotational angle sensor that detects the rotational angle of the motor. However, the individual sensors operate based on different sampling cycles and different sampling timings from each other, which leads to a reduction in accuracy of the substitute signal. Especially, when there is only a small difference between the respective detection values of the sensors, this method may result in low accuracy of the substitute signal, thus impairing responsiveness of the steering assist force and deteriorating a steering feeling at an early stage of the steering.

The present invention has been made focusing on the above-described drawback, and an object thereof is to provide a control apparatus for a vehicle-mounted apparatus and a power steering apparatus capable of appropriately controlling an actuator for the vehicle-mounted apparatus when controlling the actuator according to a first output signal and a second output signal having different sampling timings from each other.

Solution to Problem

To achieve the above-described object, according to a first aspect of the invention, a control apparatus for a vehicle-mounted apparatus includes an amplitude adjustment circuit configured to increase or reduce an amplitude or amplitudes of a first output signal output from the vehicle-mounted apparatus and/or a second output signal having a different sampling timing as the first output signal, the second output signal being output from the vehicle-mounted apparatus, and a driving signal calculation circuit configured to calculate a driving signal for driving an actuator of the vehicle-mounted apparatus based on a difference between one of the first output signal and the second output signal that is subjected to the adjustment of the amplitude thereof by the amplitude adjustment circuit, and the other of the first output signal and the second output signal.

According to a second aspect of the invention, a power steering apparatus is configured to increase or reduce an amplitude or amplitudes of a steering angle sensor output signal and/or a motor rotational angle signal, and output a motor instruction signal based on a substitute signal for a torque sensor output signal that is calculated based on at least one of the steering angle sensor output signal and the motor rotational angle signal that is subjected to the adjustment of the amplitude thereof, and the other of the steering angle sensor output signal and the motor rotational angle signal, when an abnormality is detected in the torque sensor output signal.

Advantageous Effects of Invention

Therefore, it is possible to improve the steering feeling when providing the steering assist torque based on the substitute signal for the torque sensor with use of the detection value of the steering angle sensor and the detection value of the motor rotational angle sensor.

Figure 1:
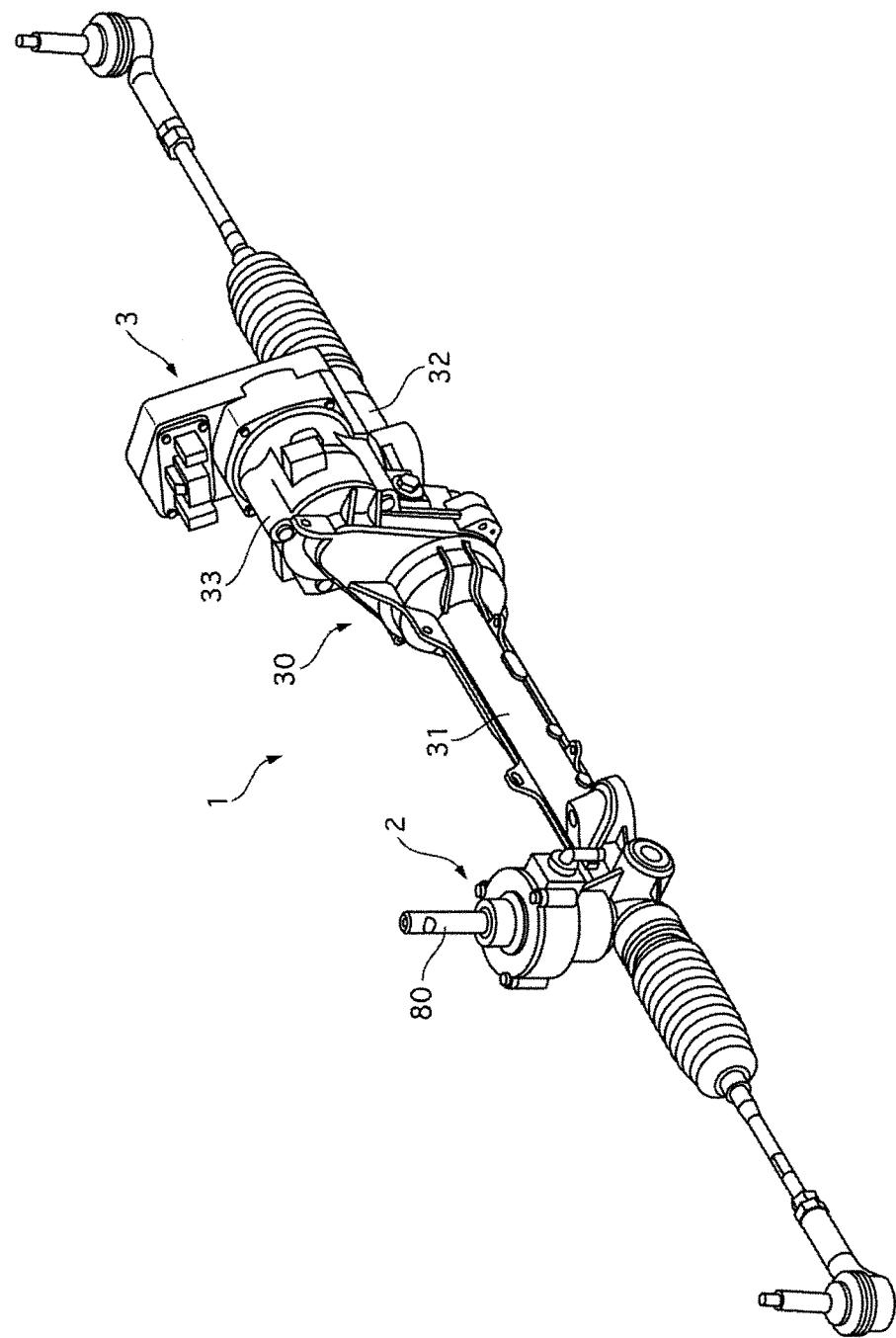
FIG. 1 is a perspective view of a power steering apparatus according to a first embodiment.

REFERENCE SIGNS LIST 1 power steering apparatus (vehicle-mounted apparatus)
2 steering mechanism
4 steering torque sensor (torque sensor)
5 steering angle sensor
6 motor rotational angle sensor
7 electronic control unit
7a main steering angle signal reception portion (first output signal reception portion)
7b main steering torque signal reception portion (torque signal reception portion)
7e motor rotational angle signal reception portion (second output signal reception portion)
7f abnormality detection circuit
7g motor control circuit (driving signal calculation circuit)
26 ball screw mechanism
40 electric motor (actuator for vehicle-mounted apparatus)
41 torsion bar
50 main gear
51 primary detection gear
52 secondary detection gear
60 suspension
61 sprung acceleration sensor (first acceleration sensor)
62 sprung acceleration signal reception portion (first output signal reception portion)
63 unsprung acceleration sensor (second acceleration sensor)
64 unsprung acceleration signal reception portion (second output signal reception portion)
65 electronic control unit (driving signal calculation circuit)
66 damping force variable actuator (actuator)
91a amplitude adjustment circuit
91b smoothing circuit
91f amplitude readjustment circuit
100 braking apparatus
101 brake pedal
102 master cylinder
103 electric motor
104 pump apparatus
105 brake caliper
106 hydraulic actuator
107 master pressure signal reception portion (first output signal reception portion)
108 master pressure sensor
109 wheel pressure signal reception portion (second output signal reception portion)
110 wheel pressure sensor
111 actuator control portion (driving signal calculation portion)

DESCRIPTION OF EMBODIMENTS

First Embodiment

A power steering apparatus 1 according to a first embodiment will be described. The power steering apparatus 1 according to the first embodiment functions to provide an assist force for assisting a steering force input by a driver by transmitting a driving force of an electric motor 40 to a wheel turning shaft 10 via a ball screw mechanism 26 (steering assist control).

Configuration of Power Steering Apparatus

Figure 2:
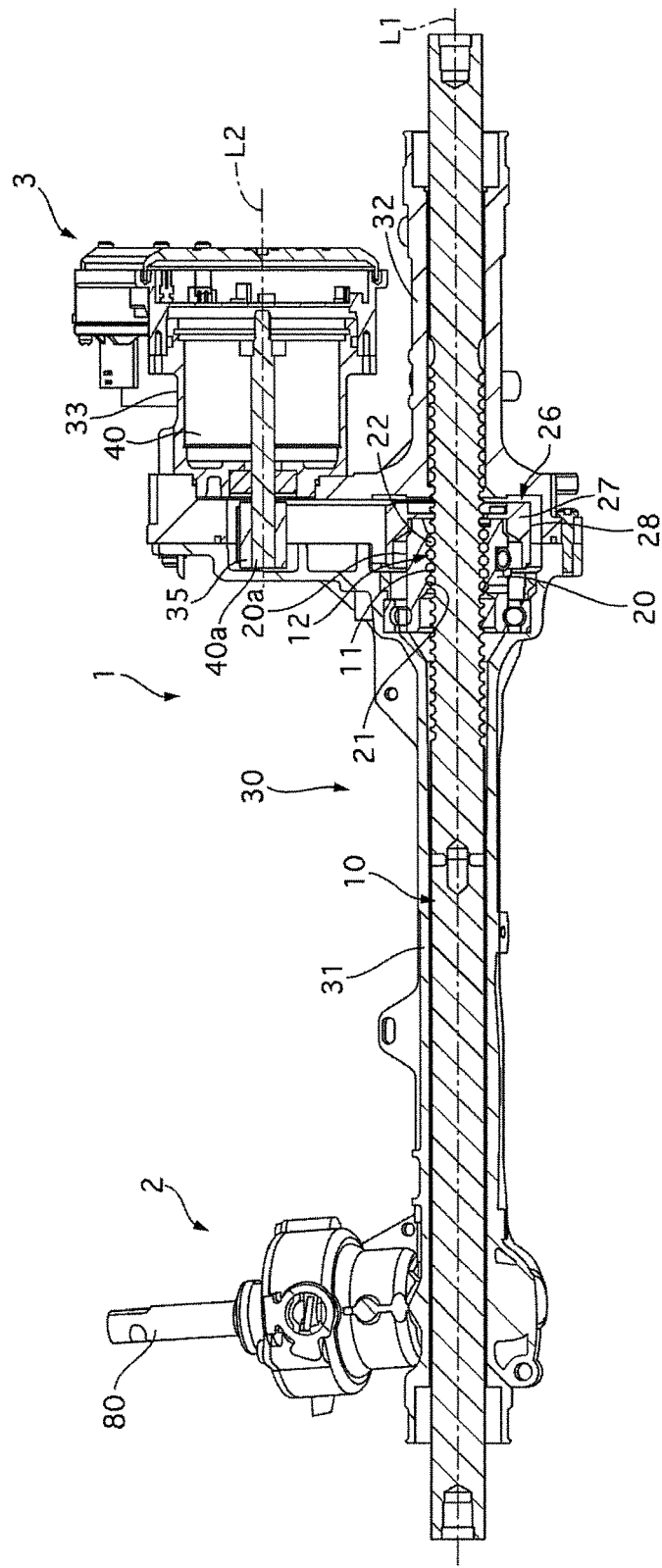
FIG. 2 is a cross-sectional view of the power steering apparatus according to the first embodiment taken along an axis of a wheel turning shaft.

FIG. 1 is a perspective view of the power steering apparatus 1. FIG. 2 is a cross-sectional view of the power steering apparatus 1 taken along an axis of the wheel turning shaft 10.

The power steering apparatus 1 includes a steering mechanism 2 and an assist mechanism 3. The steering mechanism 2 transmits a rotation of a steering wheel steered by the driver to the wheel turning shaft 10, which then turns a turning target wheel. The assist mechanism 3 provides the assist force to the wheel turning shaft 10.

Each of the components of the power steering apparatus 1 is contained in a housing 30, which includes a first housing 31, a second housing 32, and a motor housing 33.

The steering mechanism 2 includes a steering input shaft 80 coupled to the steering wheel. A pinion 81 is formed at a distal end of the steering input shaft 80. The pinion 81 is meshed with a rack formed on an outer periphery of the wheel turning shaft 10.

The assist mechanism 3 includes the electric motor 40 and the ball screw mechanism 26. The ball screw mechanism 26 transmits an output of the electric motor 40 to the wheel turning shaft 10. The output of the electric motor 40 is controlled by an electronic control unit 9 according to a steering torque and a steering amount input by the driver onto the steering wheel.

The ball screw mechanism 26 includes a nut 20 and an output pulley 27. An external appearance of the output pulley 27 is a cylindrical member, and is fixed to the nut 20 integrally rotatably. A cylindrical input pulley 35 is fixed to a driving shaft 40a of the electric motor 40 integrally rotatably. A first reference axis L1 and a second reference axis L2 are defined to be a rotational axis of the nut 20, and a rotational axis of the input pulley 35, respectively. The second reference axis L2 is positioned so as to be radially offset from the first reference axis L1. The output pulley 27, which is integrally fixed to the nut 20, is also positioned in such a manner that a rotational axis thereof coincides with the first reference axis L1.

A belt 28 is wound between the input pulley 35 and the output pulley 27. The belt 28 is made from resin. The driving force of the electric motor 40 is transmitted to the nut 20 via the input pulley 35, the belt 28, and the output pulley 27. The input pulley 35 is formed in such a manner that an outer diameter thereof is smaller than an outer diameter of the output pulley 27. A speed reducer is formed by the input pulley 35, the output pulley 27, and the belt 28.

The nut 20 is cylindrically formed so as to surround the wheel turning shaft 10, and is provided rotatably with respect to the wheel turning shaft 10. A groove is helically formed on an inner periphery of the nut 20, and this groove forms a nut-side ball screw groove 21. A helical groove is formed on an outer periphery of the wheel turning shaft 10 at a position axially away from a portion where the rack is formed, and this groove forms a wheel turning shaft-side ball screw groove 11. A ball circulation groove 12 is formed by the nut-side ball screw groove 21 and the wheel turning shaft-side ball screw groove 11 with the wheel turning shaft 10 inserted in the nut 20. A plurality of metallic balls 22 is loaded in the ball circulation groove 12. When the nut 20 rotates, the balls 22 are displaced in the ball circulation groove 12, which causes the wheel turning shaft 10 to be displaced longitudinally with respect to the nut 20.

Regarding Various Kinds of Sensors

Figure 3:
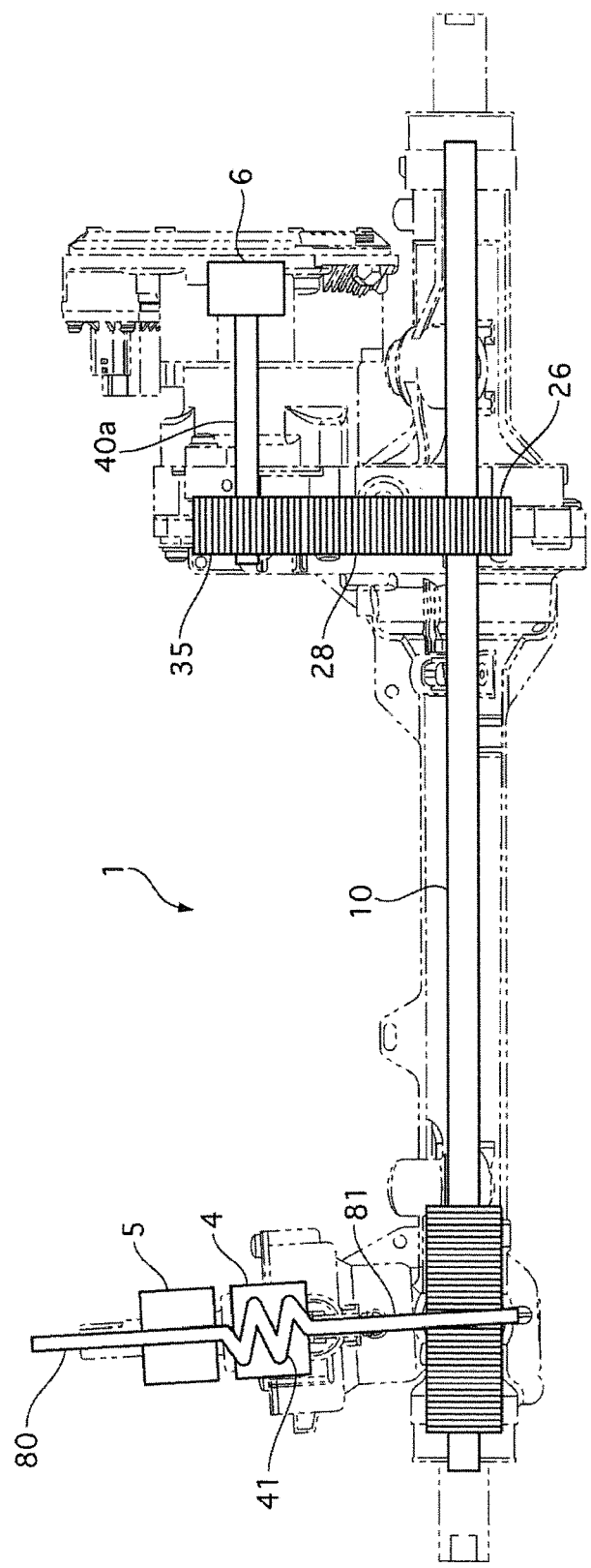
FIG. 3 is a schematic view of the power steering apparatus according to the first embodiment.

FIG. 3 is a schematic view of the power steering apparatus 1.

The power steering apparatus 1 includes a steering torque sensor 4, a steering angle sensor 5, and a motor rotational angle sensor 6. The steering torque sensor 4 detects the steering torque input by the driver onto the steering wheel. The steering angle sensor 5 detects a steering angle of the steering wheel. The rotational angle sensor 6 detects a rotational angle of a rotor of the electric motor 40.

The steering torque sensor 4 detects the steering torque based on a torsional amount of a torsion bar 41 provided between the steering input shaft 80 and the pinion 81. The torsional amount of the torsion bar 41 can be acquired from a difference between a rotational angle of the steering input shaft 80 and a rotational angle of the pinion 81. Assuming that the rotational angles of the steering input shaft 80 and the pinion 81 are θs [deg.] and θp [deg.], respectively, the steering torque Ts can be acquired from the following equation.

$$Ts=Ktb(\theta s-\theta p)$$

The steering angle sensor 5 detects the rotational angle of the steering input shaft 80 as the steering angle. The steering angle sensor 5 is provided on a steering wheel side with respect to the torsion bar 41. A sampling cycle of the steering angle sensor 5 is set to a longer cycle than a sampling cycle of the motor rotational angle sensor 6. The sampling cycles of the steering angle sensor 5 and the motor rotational angle sensor 6 will be referred to as a first sampling cycle and a second sampling cycle, respectively.

The steering torque can be acquired from a detection value of the steering angle sensor 5 and a detection value of the motor rotational angle sensor 6. The rotational angle θs [deg.] of the steering input shaft 80 can be acquired by using the detection value of the steering angle sensor 5 as this angle. The rotational angle θp [deg.] of the pinion 81 can be acquired from the following equation with use of a rotational angle θm [deg.] of the rotor of the electric motor 40 and a rate Ng at which the speed reduces from the pinion 81 to the driving shaft 40a of the electric motor 40.

$$\theta p=Ng\times\theta m$$

Configuration of Steering Angle Sensor

Figure 4:
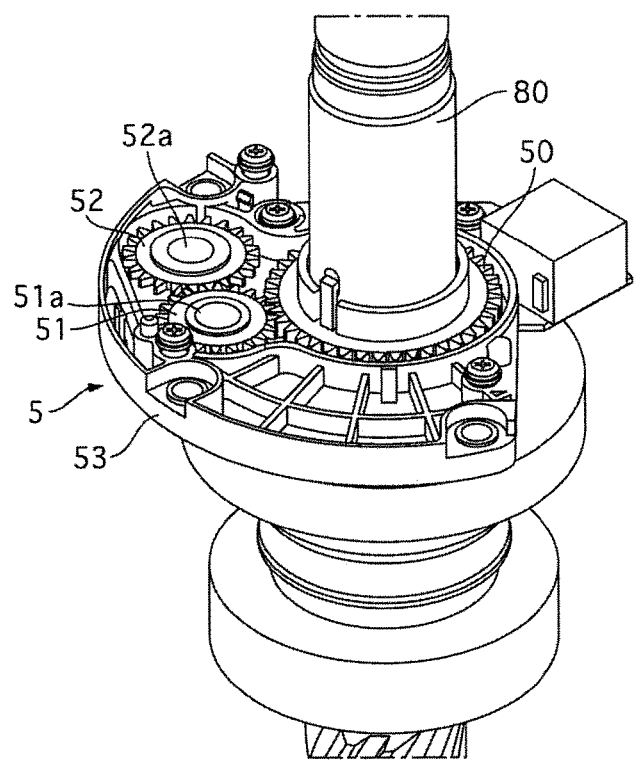
FIG. 4 is a perspective view of a steering angle sensor according to the first embodiment.
Figure 5:
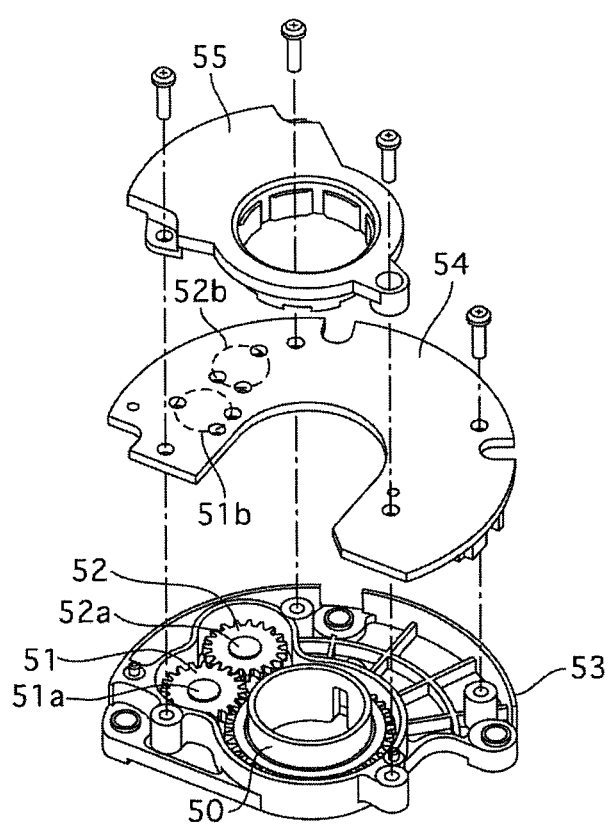
FIG. 5 is an exploded view of the steering angle sensor according to the first embodiment.

FIG. 4 is a perspective view of the steering angle sensor 5. FIG. 5 is an exploded view of the steering angle sensor 5.

The steering angle sensor 5 includes a main gear 50, a primary detection gear 51, and a secondary detection gear 52. The main gear 50 rotates integrally with the steering input shaft 80. The primary detection gear 51 is meshed with the main gear 50. The secondary detection gear 52 is meshed with the primary detection gear 51.

The main gear 50 is a gear having 40 teeth.

The primary detection gear 51 is rotatably provided in a steering angle sensor housing 53. The primary detection gear 51 is a gear having 20 teeth. A magnetic member 51a, which includes one pair of a north pole and a south pole, is mounted near a rotational axis of the primary detection gear 51. The magnetic member 51a may include two or more pairs of north poles and south poles, and may be configured in a different manner as long as the north pole and the south pole are magnetized at predetermined intervals.

The secondary detection gear 52 is rotatably provided in the steering angle sensor housing 53. The secondary detection gear 52 is a gear having 19 teeth. A magnetic member 52a, which includes one pair of a north pole and a south pole, is mounted near a rotational axis of the secondary detection gear 52. The magnetic member 52a may include two or more pairs of north poles and south poles, and may be configured in a different manner as long as the north pole and the south pole are magnetized at predetermined intervals.

Magnetoresistive elements 51b and 52b (MR elements) are provided on an electronic substrate 54 at positions facing the magnetic members 51a and 51b, respectively. The magnetoresistive elements 51b and 52b each detect a change in a magnetic field generated between the north pole and the south pole of the magnetic member 51a or 52a as a change in a resistance value of a resistive element.

Each of the elements of the steering angle sensor 5 is contained in the steering angle sensor housing 53. One side of the steering angle sensor housing 53 is opened. Then, after each of the elements of the steering angle sensor 5 is contained in the steering angle sensor housing 53, the electronic substrate 54 is contained on the one side where the steering angle sensor housing 53 is opened, and this opening side is closed by a steering angle sensor cover 55.

Block Diagram of Electric System

Figure 6:
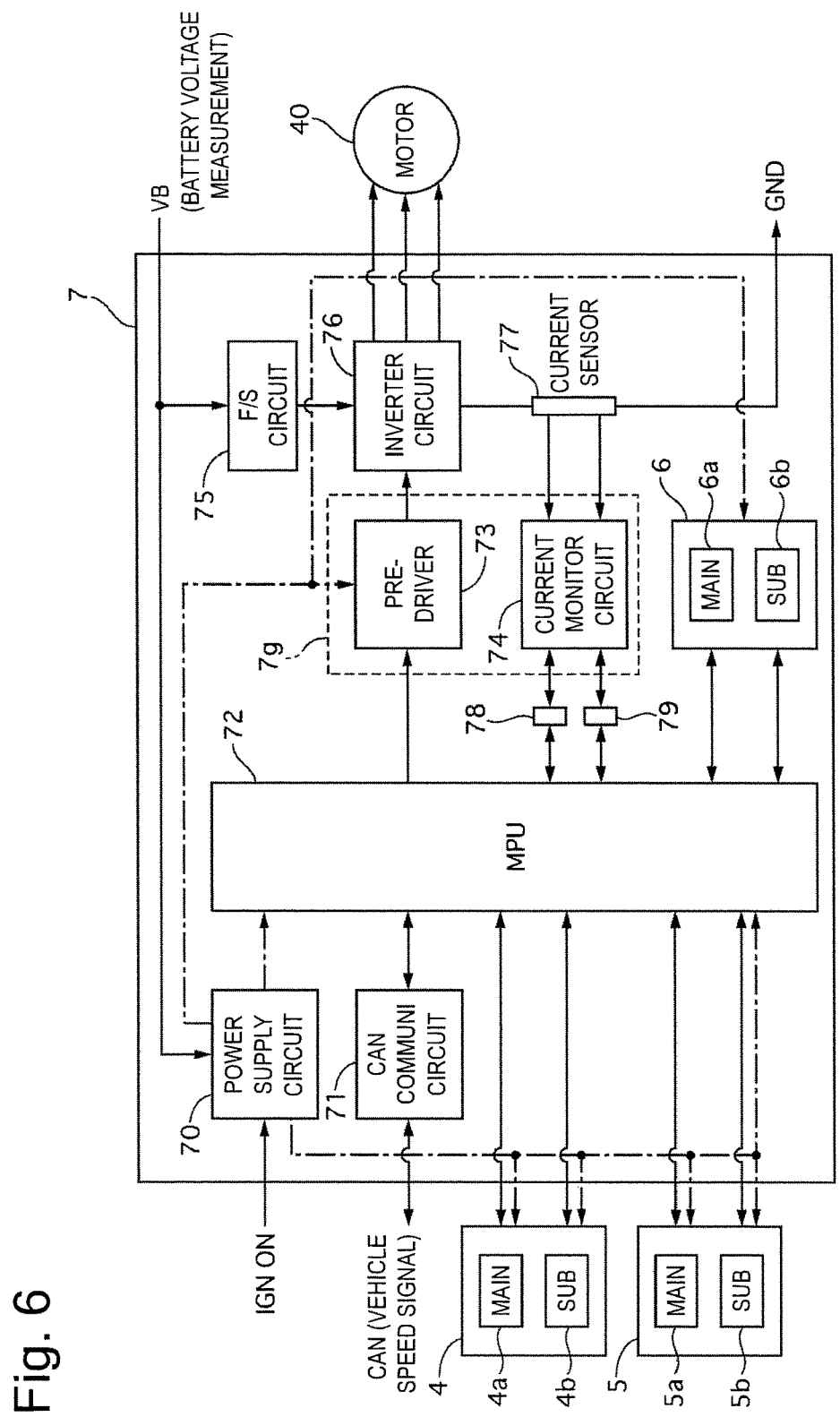
FIG. 6 is a block diagram of an electric system according to the first embodiment.

FIG. 6 is a block diagram of an electric system.

The steering torque sensor 4 includes two sensors, a main steering torque sensor 4a and a sub steering torque sensor 4b. The steering angle sensor 5 includes two sensors, a main steering angle sensor 5a and a sub steering angle sensor 5b. The motor rotational angle sensor 6 includes two sensors, a main motor rotational angle sensor 6a and a sub motor rotational angle sensor 6b. The motor rotational sensor 6 is built in the electronic control unit 7.

The electronic control unit 7 includes a power supply circuit 70, a CAN communication circuit 71, a microprocessor 72, a pre-driver 73, a current monitor circuit 74, a fail-safe circuit 75, an inverter circuit 76, a current sensor 77, a first current detection circuit 78, and a second current detection circuit 79.

When an ignition switch is switched on, the power supply circuit 70 supplies battery power to the steering torque sensor 4, the steering angle sensor 5, the motor rotational angle sensor 6, the microprocessor 72, and the pre-driver 73.

The CAN communication circuit 71 exchanges a signal with a controller area network (Controller Area Network: CAN).

The microprocessor 72 receives vehicle speed information of this vehicle itself from the CAN communication circuit 71, steering torque information from the steering torque sensor 4, steering angle information (a steering angle sensor output signal) from the steering angle sensor 5, motor rotational angle information from the motor rotational angle sensor 6, and current value information from the first current detection circuit 78 and the second current detection circuit 79. The microprocessor 72 calculates an assist torque to be output by the electric motor 40 based on these kinds of information, and outputs the calculated assist torque to the pre-driver 73.

The pre-driver 73 generates a control signal for the inverter circuit 76 based on the assist torque calculated by the microprocessor 72, and outputs the generated control signal to the inverter circuit 76.

The current monitor circuit 74 receives a detection value of the current sensor 77, which detects a current flowing in the inverter circuit 76. The current monitor circuit 74 monitors whether a current value required for the control of the electric motor 40 is output as targeted so as to output the assist torque calculated by the microprocessor 72. A motor control circuit 7g is formed by the pre-driver 73 and the current monitor circuit 74.

When the microprocessor 72 detects an abnormality in the system and determines to shut down the system, the fail-safe circuit 75 stops the power supply from the inverter circuit 76 to the electric motor 40 based on an instruction from the microprocessor 72.

The inverter circuit 76 includes a driving element for supplying the current to the electric motor 40. The inverter circuit 76 supplies a driving current to the electric motor 40 based on an instruction from the pre-driver 73.

The first current detection circuit 78 performs highly-responsive filter processing on the current value input to the current monitor circuit 74, and outputs a result thereof to the microprocessor 72. The second current detection circuit 79 performs low-responsive filter processing on the current value input to the current monitor circuit 74, and outputs a result thereof to the microprocessor 72. The current value processed by the highly-responsive filter processing is used to control the electric motor 40. The current value processed by the low-responsive filter processing is adjusted into an average current value and is used to monitor an eddy current of the inverter circuit 76.

Block Diagram of Sensors

Figure 7:
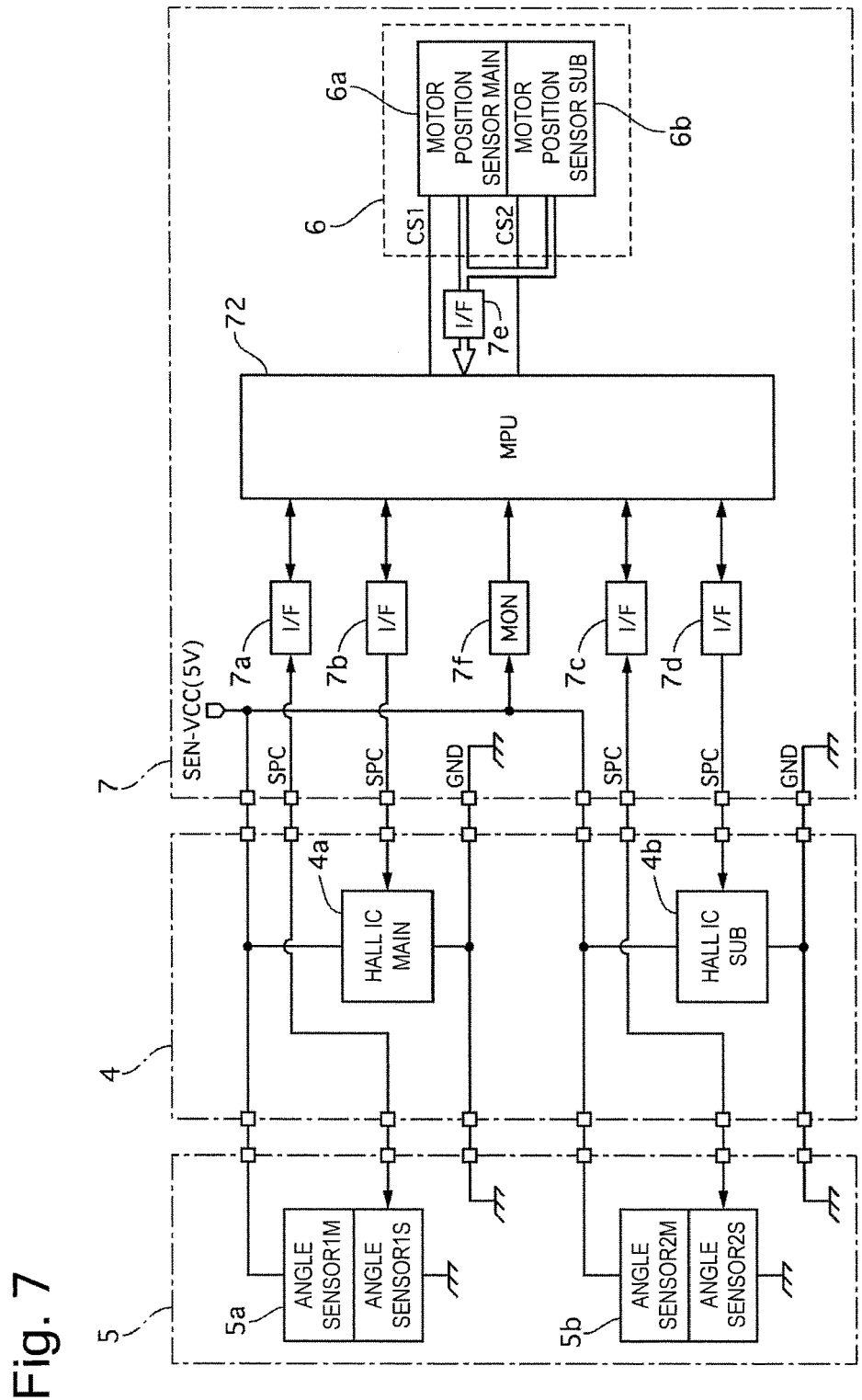
FIG. 7 is a block diagram of sensors according to the first embodiment.

FIG. 7 is a block diagram of the sensors.

The main steering torque sensor 4a is connected to the microprocessor 72 via a main steering torque signal reception portion 7b provided in the electronic control unit 7. The sub steering torque sensor 4b is connected to the microprocessor 72 via a sub steering torque signal reception portion 7d provided in the electronic control unit 7. The main steering angle sensor 5a is connected to the microprocessor 72 via a main steering angle signal reception portion 7a provided in the electronic control unit 7. The sub steering angle sensor 5b is connected to the microprocessor 72 via a sub steering angle signal reception portion 7c provided in the electronic control unit 7. The main motor rotational angle sensor 6a and the sub motor rotational angle sensor 6b are connected to the microprocessor 72 via a motor rotational angle signal reception portion 7e provided in the electronic control unit 7.

The main steering torque sensor 4a, the sub steering torque sensor 4b, the main steering angle sensor 5a, and the sub steering angle sensor 5b are connected to an abnormality detection circuit 7f provided in the electronic control unit 7. The abnormality detection circuit 7f monitors an abnormality in each of the sensors, and, upon occurrence of an abnormality in a sensor, outputs information about the sensor where the abnormality has occurred to the microprocessor 72.

Control Block Diagram

Figure 8:
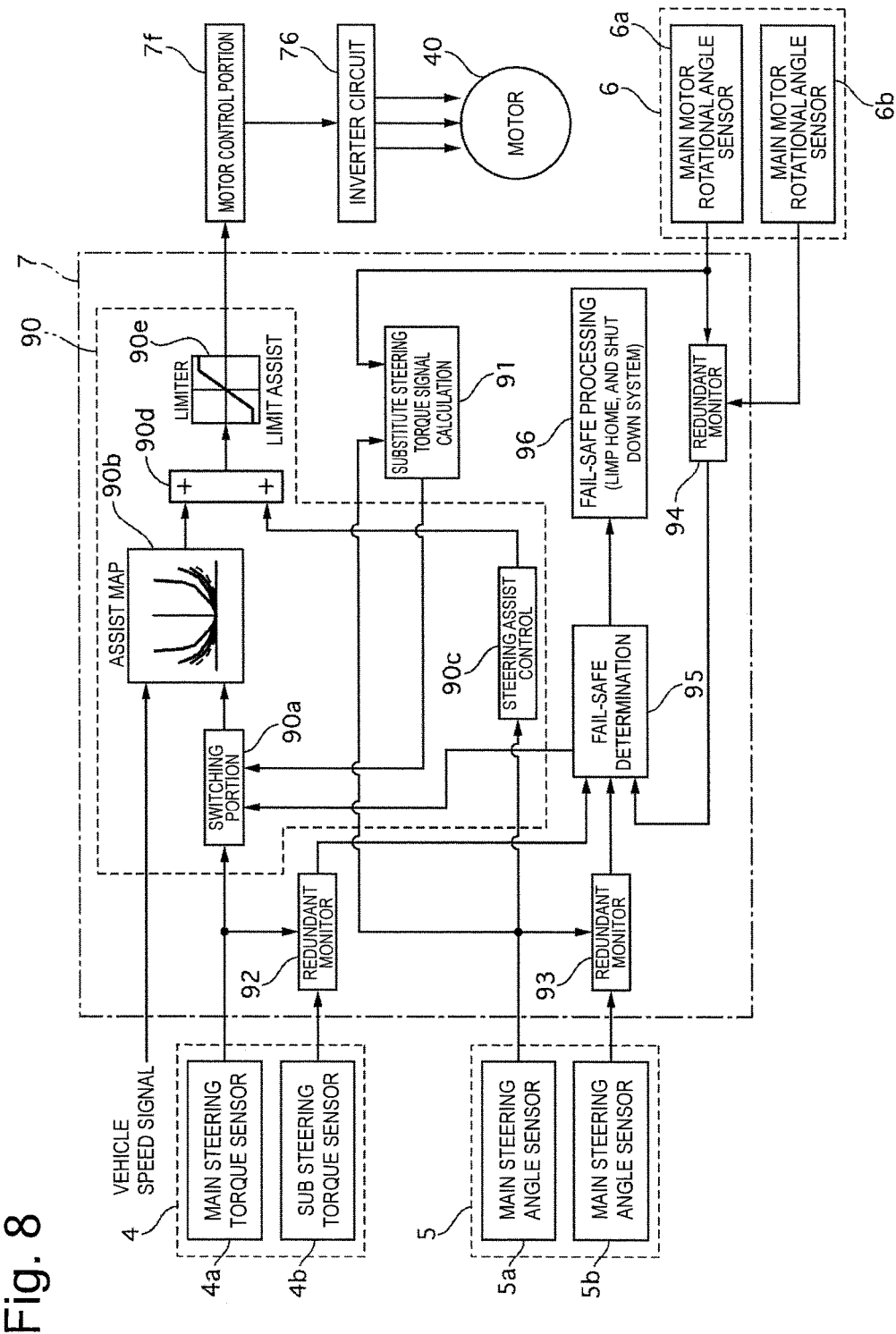
FIG. 8 is a control block diagram according to the first embodiment.

FIG. 8 is a control block diagram.

The electronic control unit 7 includes a motor control circuit 90, a substitute signal calculation circuit 91, a steering torque sensor redundant monitor circuit 92, a steering angle sensor redundant monitor circuit 93, a motor rotational angle sensor redundant monitor circuit 94, a fail-safe determination circuit 95, and a fail-safe processing circuit 96.

The motor control circuit 90 includes a switching portion 90a, an assist map 90b, a steering assist control portion 90c, an addition portion 90d, and a limiter 90e.

The switching portion 90a outputs the steering torque signal of the main steering torque sensor 4a to the assist map 90b at normal times. When an abnormality is detected in the steering torque sensor 4, the switching portion 90a outputs a steering torque signal calculated by the substitute signal calculation circuit 91 (hereinafter referred to as a substitute steering torque signal) to the assist map 90b.

Figure 9:
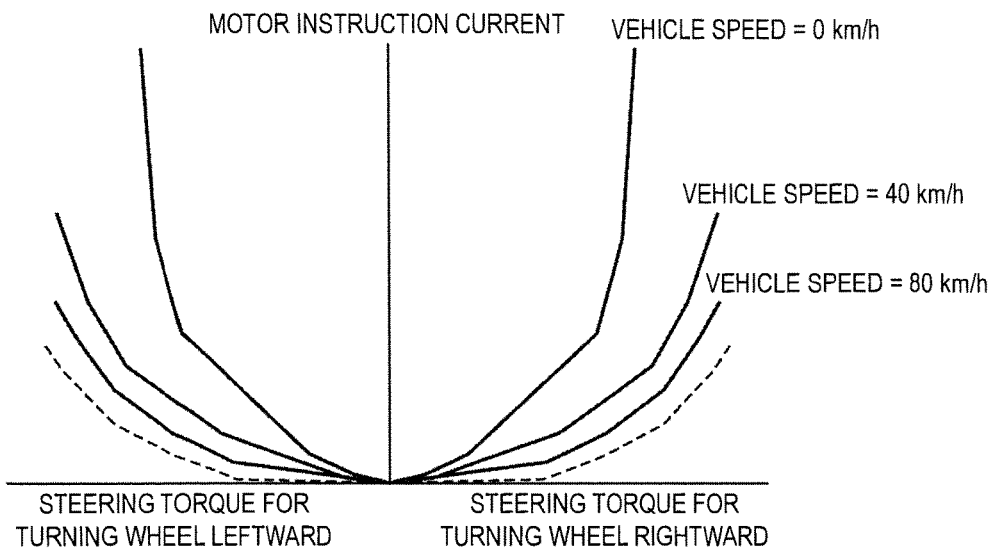
FIG. 9 illustrates an assist map according to the first embodiment.

By the assist map 90b a motor instruction current is acquired from the steering torque signal of the main steering torque sensor 4a or the substitute signal calculation circuit 91, and from the vehicle speed signal. FIG. 9 is a graph indicating the assist map 90b. The assist map 90b is a map for acquiring the motor instruction current from the steering torque. The motor instruction current is set so as to reduce as the vehicle speed increases.

The steering assist control portion 90c calculates a motor instruction current for providing an assist torque when the steering wheel is steered in a return direction from the steering angle signal of the main steering angle sensor 5a (return control).

Figure 10:
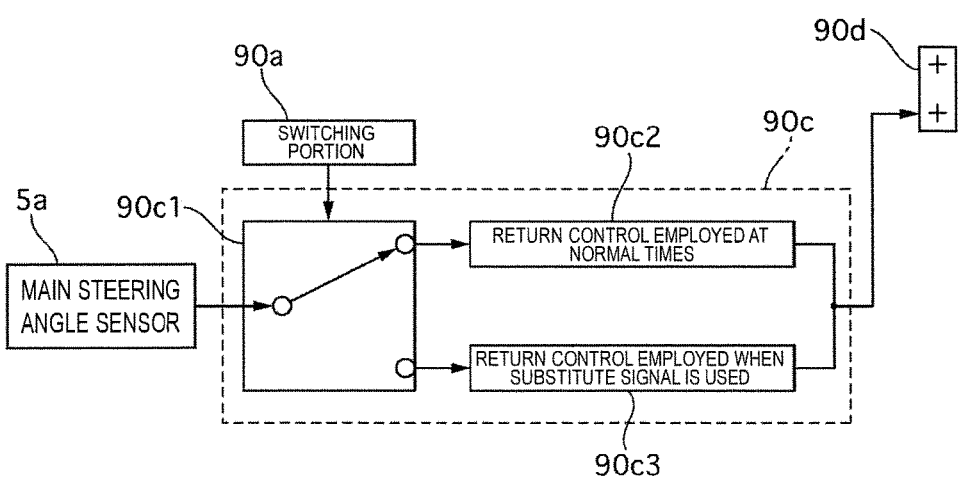
FIG. 10 is a control block diagram of a steering assist control portion according to the first embodiment.

FIG. 10 is a control block diagram of the steering assist control portion 90c. The steering assist control portion 90c includes a switch circuit 90c1, a circuit 90c2 for the return control employed at normal times, and a circuit 90c3 for the return control employed when the substitute signal is used. The switch circuit 90c1 outputs the steering angle signal of the main steering angle sensor 5a to the circuit 90c2 for the return control employed at normal times, when the steering torque signal of the main steering torque sensor 4a is output to the assist map 90b at the switching portion 90a. The switch circuit 90c1 outputs the steering angle signal of the main steering angle sensor 5a to the circuit 90c3 for the return control employed when the substitute signal is used, when the substitute steering torque signal is output to the assist map 90b at the switching portion 90a.

The steering angle signal is amplified to calculate the substitute torque signal. If the return control is performed with use of the steering angle signal without amplifying the steering angle signal when the substitute torque signal is used, the return of the steering wheel is deteriorated. Therefore, a gain of the circuit 90c3 for the return control employed when the substitute signal is used is set to a smaller value than a gain of the circuit 90c4 for the return control employed at normal times.

The addition portion 90d adds an output value of the assist map 90b and an output value of the steering assist control portion 90c, thereby generating a final motor instruction current.

When the motor instruction current exceeds a set upper limit value, the limiter 90e outputs this upper limit value to the motor control circuit 7g as the motor instruction current.

Figure 11:
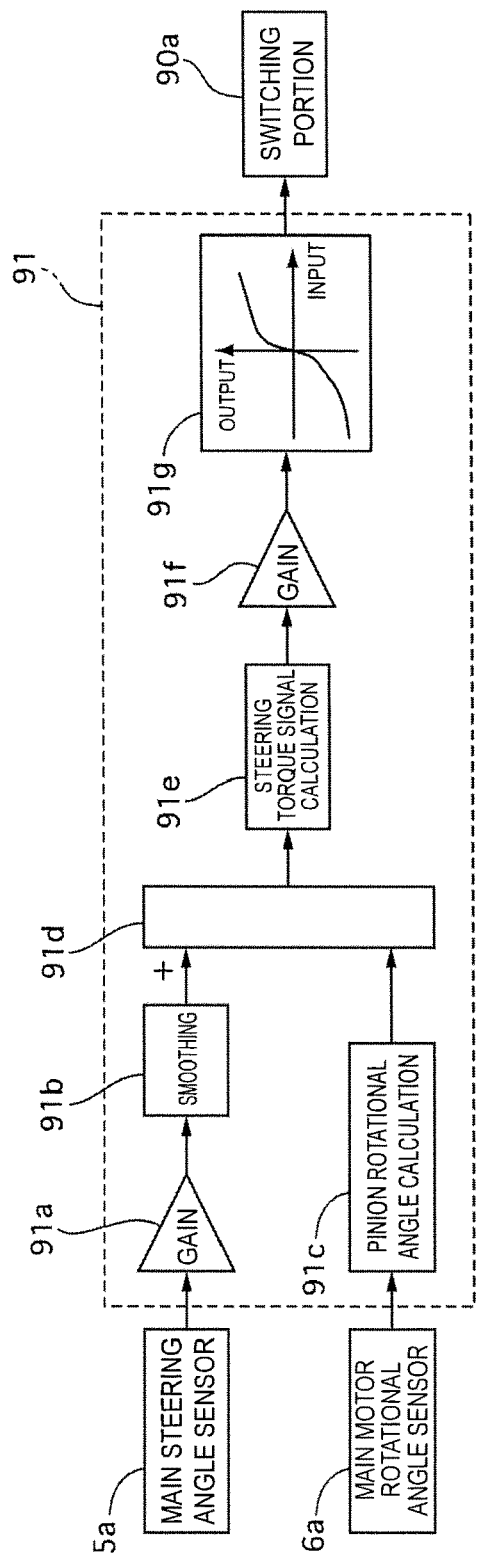
FIG. 11 is a control block diagram of a substitute signal calculation circuit according to the first embodiment.

The substitute signal calculation circuit 91 calculates the steering torque from the steering angle detected by the main steering angle sensor 5a and the motor rotational angle detected by the main motor rotational angle sensor 6a. FIG. 11 is a control block diagram of the substitute signal calculation circuit 91. The substitute signal calculation circuit 91 includes an amplitude adjustment circuit 91a, a smoothing circuit 91b, a pinion rotational angle calculation circuit 91c, an addition/subtraction circuit 91d, a steering torque calculation circuit 91e, an amplitude readjustment circuit 91f, and a non-linear correction circuit 90g.

The amplitude adjustment circuit 91a increases the amplitude of the steering angle signal of the main steering angle sensor 5a.

The smoothing circuit 91b smooths the steering angle signal with the amplitude thereof increased.

The pinion rotational angle calculation circuit 91c calculates a pinion rotational angle from the motor rotational angle signal detected by the main motor rotational angle sensor 6a.

The addition/subtraction circuit 91b subtracts the pinion rotational angle signal calculated from the motor rotational angle signal, from the smoothed and amplified steering angle signal.

The steering torque calculation circuit 91e multiplies an output value of the addition/subtraction circuit 91d by torsional rigidity Ktb [Nm/deg] of the torsion bar 41, and outputs a result thereof as the substitute steering torque signal.

The amplitude readjustment circuit 91f reduces the amplitude of the substitute steering torque signal. A gain used to reduce the amplitude of the substitute steering torque signal is set to a reciprocal of a gain used when the amplitude adjustment circuit 91a increases the amplitude of the steering torque signal of the main steering angle sensor 5a. In other words, if the amplitude adjustment circuit 91a increases the amplitude by X times, the amplitude readjustment circuit 91f multiplies the amplitude by 1/X.

Figure 12:
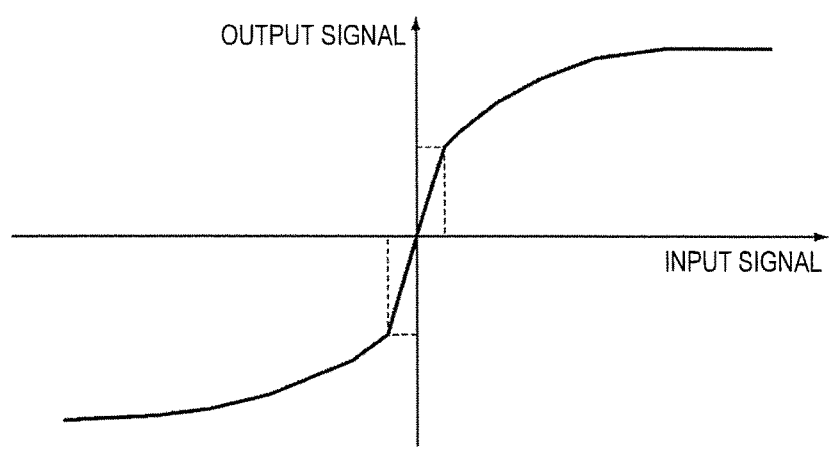
FIG. 12 is a non-linear correction map according to the first embodiment.

The non-linear correction circuit 91g performs non-linear correction processing on an output value of the amplitude readjustment circuit 91f. FIG. 12 illustrates a non-linear correction map. As illustrated in FIG. 12, the non-linear correction map is set in such a manner that an output signal exceeds an input signal around where the output value of the addition/subtraction circuit 91d (the input signal) is zero. Further, the non-linear correction map is set in such a manner that the output signal reduces as the input signal increases. This setting can improve responsiveness when generating the steering assist torque at an early stage of the steering.

The steering torque sensor redundant monitor circuit 92 compares the output value of the main steering torque sensor 4a and the output value of the sub steering torque sensor 4b, and determines that an abnormality has occurred in the steering torque sensor 4 if a difference between the output values is larger than a predetermined value.

The steering angle sensor redundant monitor circuit 93 compares the output value of the main steering angle sensor 5a and the output value of the sub steering angle sensor 5b, and determines that an abnormality has occurred in the steering angle sensor 5 if a difference between the output values is larger than a predetermined value.

The motor rotational angle sensor redundant monitor circuit 94 compares the output value of the main motor rotational angle sensor 6a and the output value of the sub motor rotational angle sensor 6b, and determines that an abnormality has occurred in the motor rotational angle sensor 6 if a difference between the output values is larger than a predetermined value.

The electronic control unit 7 determines occurrence of an abnormality in the sensor by comparing the respective output values of the sensors with use of the steering torque sensor redundant monitor circuit 92, the steering angle sensor redundant monitor circuit 93, and the motor rotational angle sensor redundant monitor circuit 94, and therefore can reduce a processing load imposed on the microprocessor 72.

The fail-safe determination circuit 95 receives signals of the steering torque sensor redundant monitor circuit 92, the steering angle sensor redundant monitor circuit 93, and the motor rotational angle sensor redundant monitor circuit 94, and determines a fail-safe method according to the sensor where the abnormality has occurred.

The fail-safe processing circuit 96 performs fail-safe processing based on the fail-safe method determined by the fail-safe determination circuit 95.

Processing for Determining Fail-Safe Method

Figure 13:
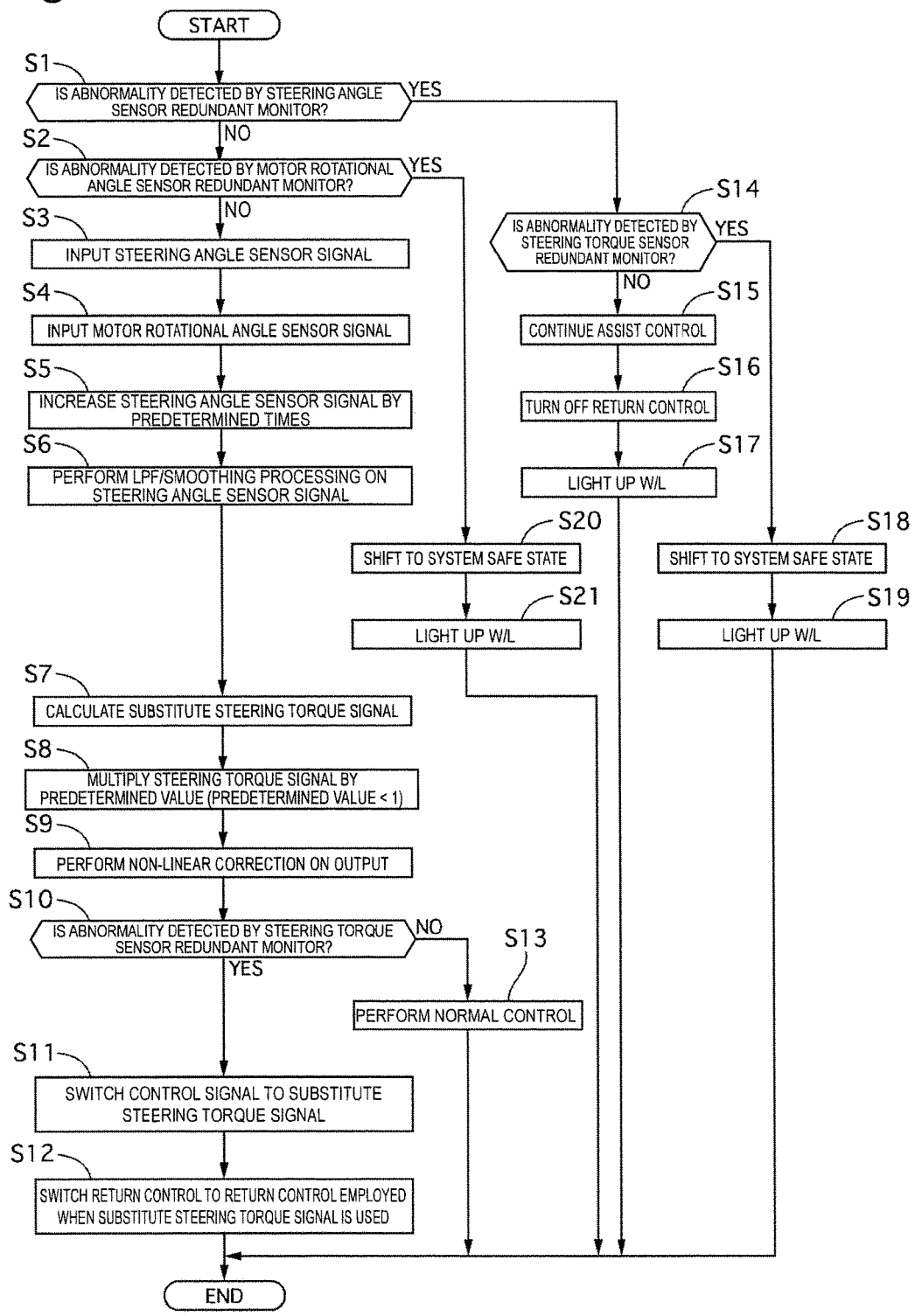
FIG. 13 is a flowchart illustrating a flow of processing for determining a fail-safe method according to the first embodiment.

FIG. 13 is a flowchart illustrating a flow of processing for determining the fail-safe method.

In step S1, the electronic control unit 7 determines whether an abnormality has occurred in the steering angle sensor 5. If an abnormality has occurred, the processing proceeds to step S13. If no abnormality has occurred, the processing proceeds to step S2.

In step S2, the electronic control unit 7 determines whether an abnormality has occurred in the motor rotational angle sensor 6. If an abnormality has occurred, the processing proceeds to step S19. If no abnormality has occurred, the processing proceeds to step S3.

In step S3, the electronic control unit 7 receives the steering angle signal from the main steering angle sensor 5a. Then, the processing proceeds to step S4.

In step S4, the electronic control unit 7 receives the motor rotational angle signal from the main motor rotational angle sensor 6a. Then, the processing proceeds to step S5.

In step S5, the electronic control unit 7 increases the amplitude of the steering angle signal by predetermined times (X times). Then, the processing proceeds to step S6.

In step S6, the electronic control unit 7 performs the smoothing processing on the amplified steering angle signal. Then, the processing proceeds to step S7.

In step S7, the electronic control unit 7 calculates the substitute steering torque signal from the steering angle signal and the motor rotational angle signal. Then, the processing proceeds to step S8.

In step S8, the electronic control unit 7 reduces the amplitude of the substitute steering torque signal by the predetermined times (1/X times). Then, the processing proceeds to step S9.

In step S9, the electronic control unit 7 performs the non-linear correction processing on the substitute steering torque signal. Then, the processing proceeds to step S10.

In step S10, the electronic control unit 7 determines whether an abnormality has occurred in the steering torque sensor 4. If an abnormality has occurred, the processing proceeds to step S13. If no abnormality has occurred, the processing proceeds to step S11.

In step S11, the electronic control unit 7 switches the signal to be output to the assist map 90b to the substitute steering torque signal. Then, the processing proceeds to step S12.

In step S12, the electronic control unit 7 switches the control to the return control employed when the substitute signal is used in the steering assist control portion 90c. Then, the processing is ended.

In step S13, the electronic control unit 7 performs normal control. Then, the processing is ended. The normal control refers to performing control while switching the signal to be output to the assist map 90b to the steering torque signal of the main steering torque sensor 4a and switching the control to the return control employed at normal times in the steering assist control portion 90c.

In step S14, the electronic control unit 7 determines whether an abnormality has occurred in the steering torque sensor 4. If an abnormality has occurred, the processing proceeds to step S15. If no abnormality has occurred, the processing proceeds to step S18.

In step S15, the electronic control unit 7 continues the steering assist control. Then, the processing proceeds to step S16.

In step S16, the electronic control unit 7 turns off the return control. Then, the processing proceeds to step S17.

In step S17, the electronic control unit 7 lights up a warning lamp. Then, the processing is ended.

In step S18, the electronic control unit 7 establishes a system safe state. Then, the processing proceeds to step S19. The system safe state means that the steering assist control is turned off.

In step S19, the electronic control unit 7 lights up the warning lamp. Then, the processing is ended.

In step S20, the electronic control unit 7 establishes the system safe state. Then, the processing proceeds to step S21. In step S21, the electronic control unit 7 lights up the warning lamp. Then, the processing is ended.

Processing for Selecting Return Control

Figure 14:
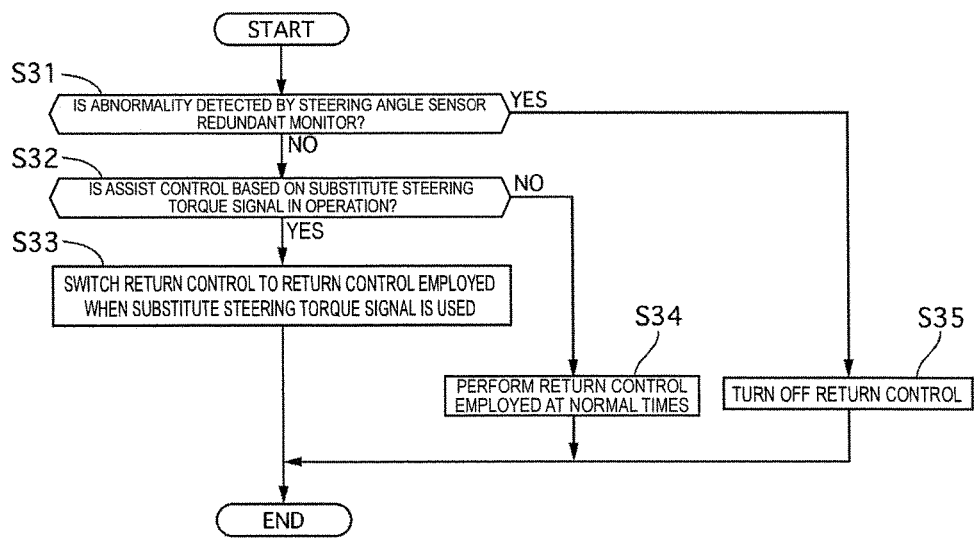
FIG. 14 is a flowchart illustrating a flow of processing for selecting control at the time of return control performed by the steering assist control portion according to the first embodiment.

FIG. 14 is a flowchart illustrating a flow of processing for selecting control at the time of the return control to be performed by the steering assist control portion 90c.

In step S31, the electronic control unit 7 determines whether an abnormality has occurred in the steering angle sensor 5. If an abnormality has occurred, the processing proceeds to step S34. If no abnormality has occurred, the processing proceeds to step S32.

In step S32, the electronic control unit 7 determines whether the steering assist control based on the substitute steering torque signal is in operation. If the steering assist control based on the substitute steering torque signal is in operation, the processing proceeds to step S33. If the steering assist control based on the substitute steering torque signal is not in operation, the processing proceeds to step S35.

In step S33, the electronic control unit 7 performs the return control employed when the substitute signal is used. Then, the processing is ended.

In step S34, the electronic control unit 7 performs the return control employed at normal times. Then, the processing is ended.

In step S35, the electronic control unit 7 cancels the return control. Then, the processing is ended.

Functions

When an abnormality has occurred in the steering torque sensor 4, the steering torque can be acquired from the steering angle signal of the steering angle sensor 5 and the pinion rotational angle acquired from the motor rotational angle signal of the motor rotational angle sensor 6.

Figure 15:
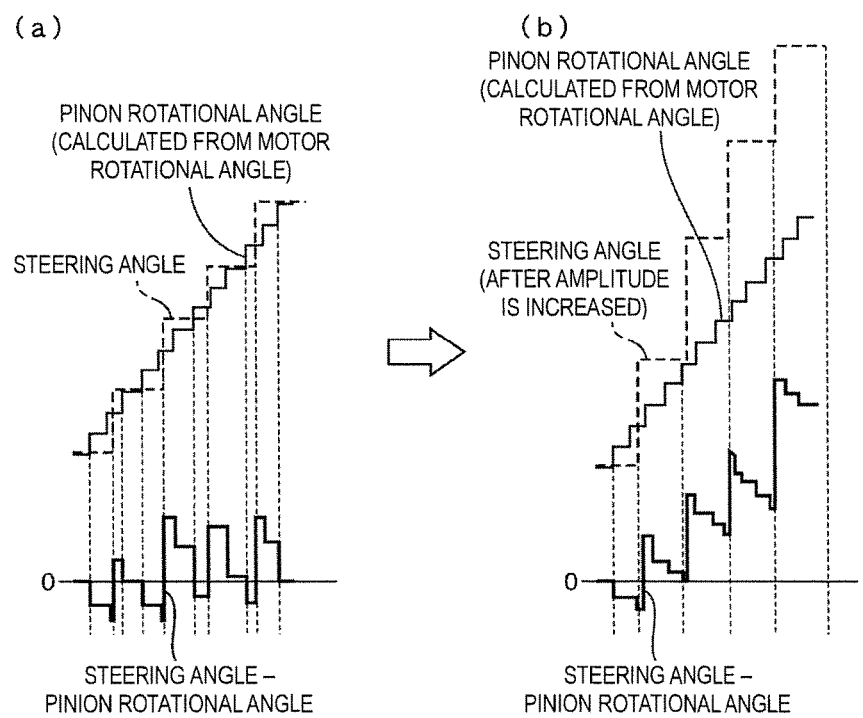
FIGS. 15($a$) and 15($b$) are graphs indicating a steering angle signal, a pinion rotational angle acquired from a motor rotational angle signal, and a difference between the steering angle signal and a pinion rotational angle acquired from the motor rotational angle signal according to the first embodiment.
Figure 16:
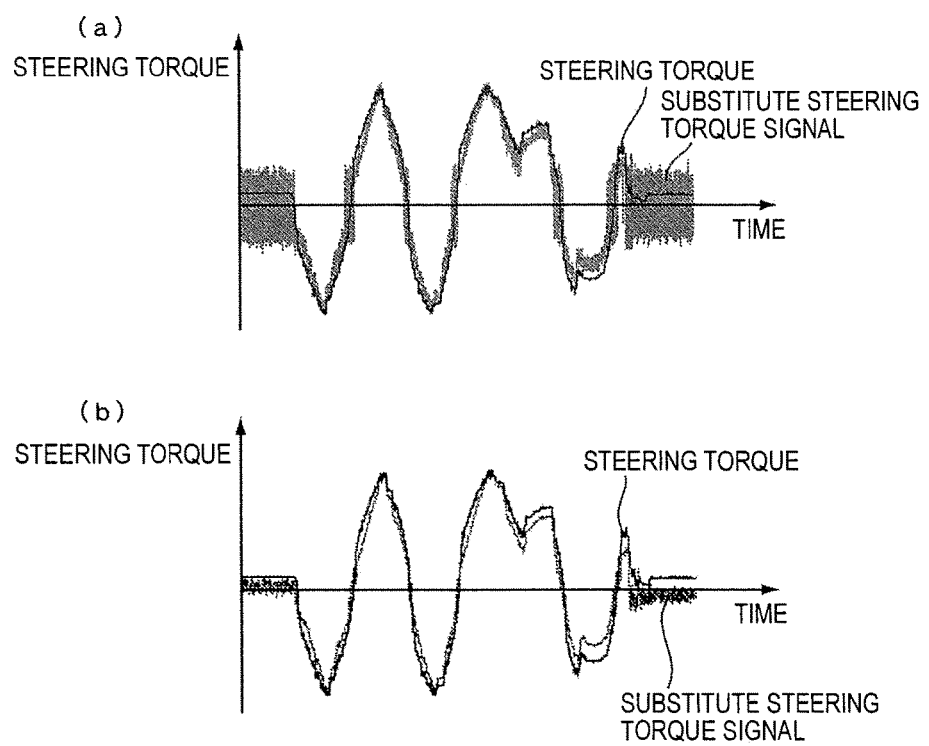
FIGS. 16(a) and 16(b) are graphs indicating a steering torque and a substitute steering torque signal according to the first embodiment.

FIGS. 15(a) and 15(b) are graphs indicating the steering angle signal, the pinion rotational angle acquired from the motor rotational angle signal, and a difference between the steering angle signal and the pinion rotational angle acquired from the motor rotational angle signal. FIG. 15(a) is a graph when the amplitude of the steering angle signal is not increased. FIG. 15(b) is a graph when the amplitude of the steering angle signal is increased. FIGS. 16(a) and 16(b) are graphs indicating the steering torque and the substitute steering torque signal. FIG. 16(a) is a graph when the amplitude of the steering angle signal is not increased. FIG. 16(b) is a graph when the amplitude of the steering angle signal is increased.

The sampling cycle of the steering angle sensor 5 is longer than the sampling cycle of the motor rotational angle sensor 6. Therefore, the motor rotational angle signal is updated (sampled) in the middle of one sampling cycle of the steering angle sensor 5. In other words, since the steering angle sensor 5 and the motor rotational angle sensor 6 sample the respective signals at different timings, an attempt to acquire the difference between the steering angle signal and the pinion rotational angle acquired from the motor rotational angle signal may lead to hunting between a positive value and a negative value across a zero point as illustrated in FIG. 15(a). Calculating the substitute steering torque signal based on this signal also results in hunting of the substitute steering torque as illustrated in FIG. 16(a). Especially when the steering torque is small, this calculation results in hunting of the substitute steering torque signal between a positive value and a negative value across the zero point. Therefore, the steering assist torque is generated as if vibrating in a rightward-steering direction and a leftward-steering direction of the steering wheel. Thus, when the driver starts steering the steering wheel, the vibration is transmitted from the steering wheel to the driver, which may make the driver feel uneasy.

Therefore, in the first embodiment, the electronic control unit is configured to increase the amplitude of the steering angle signal and acquire the difference between the steering angle signal after the amplitude thereof is increased and the pinion rotational angle acquired from the motor rotational angle signal. As illustrated in FIG. 15(b), due to an increase in the difference between the steering angle signal after the amplitude thereof is increased and the pinion rotational angle acquired from the motor rotational angle signal, the hunting between a positive value and a negative value across the zero point is reduced. Further, as illustrated in FIG. 16(b), an amount of the hunting of the substitute steering torque signal is also reduced. Therefore, this method can improve the driver's steering feeling.

Further, in the first embodiment, the electronic control unit is configured to increase the amplitude of the steering angle signal rather than the pinion rotational angle acquired from the motor rotational angle signal. The electronic control unit is configured to acquire the difference between the steering angle signal after the amplitude thereof is increased and the pinion rotational angle acquired from the motor rotational angle signal, and reduce the amplitude of this difference according to the reciprocal of the value multiplied when the amplitude of the steering angle signal is increased (reduce the amplitude by multiplying it by 1/X times if the amplitude is increased by X times).

Therefore, in the final difference value, a ratio of the steering angle signal is increased compared to a ratio of the pinion rotational angle acquired from the motor rotational angle. However, the increased ratio corresponds to a ratio of the signal of the steering angle sensor 5 disposed at a position close to the steering wheel on which the driver inputs the steering force. Therefore, the driver's steering of the steering wheel is emphasized, so that a signal sensitively responding to the steering is attained as the final difference value. Therefore, the driver's steering can be strongly reflected in the steering assist control.

Further, in the first embodiment, the electronic control unit is configured to smooth the steering angle signal by the smoothing circuit 91*b*. As the sampling cycle is longer, the difference tends to be larger between the value when the signal is sampled last time and the value when the signal is sampled currently. The change in the steering angle signal can be smoothed by the smoothing of the steering angle signal having the long sampling cycle. As a result, the first embodiment can prevent or reduce unsteadiness (a fluctuation) of the substitute steering torque signal due to the difference between the sampling cycles.

Further, since the steering angle sensor 5 is formed by the combination of the plurality of gears, a backlash is generated. Accordingly, this configuration leads to occurrence of a non-response time period during which the signal fails to change when the steering direction is switched. Smoothing the steering angle signal can make the change in the signal smooth, and eliminate or reduce the non-response time period.

Further, in the first embodiment, the ball screw mechanism 26, which transmits the rotational force of the electric motor 40 to the steering mechanism 2, is employed as the speed reducer between the steering mechanism 2 and the electric motor 40. A speed reduction rate of the ball screw mechanism 26 is higher than other types of speed reducers. Therefore, the influence of the difference between the sampling cycle of the steering angle sensor 5 and the sampling cycle of the motor rotational angle sensor 6 is enhanced due to the speed reduction rate of the ball screw mechanism 26 when the substitute torque signal is acquired. Therefore, especially in the case where the ball screw mechanism 26 is employed as the speed reducer like the first embodiment, increasing the amplitude of the steering angle signal and acquiring the difference from the pinion rotational angle acquired from the motor rotational angle signal can contribute to the improvement of the steering feeling of the driver.

Advantageous Effects (1) The control apparatus for the power steering apparatus 1 (an vehicle-mounted apparatus) includes the main steering angle signal reception portion 7*a* (a first output signal reception portion) and the motor rotational angle signal reception portion 7*e* (a second output signal reception portion) configured to receive the steering angle sensor output signal (a first output signal) output from the power steering apparatus 1 and the motor rotational angle signal (a second output signal) having the different sampling timing from the steering angle sensor output signal, respectively, the amplitude adjustment circuit 91*a* (an amplitude adjustment circuit) configured to increase or reduce the amplitude(s) of the steering angle sensor output signal and/or the motor rotational angle signal, and the motor control circuit 7*g* (a driving signal calculation circuit) configured to calculate the motor instruction signal (a driving signal) for driving the electric motor 40 (an actuator of the vehicle-mounted apparatus) based on the difference between one of the steering angle sensor output signal and the motor rotational angle signal that is subjected to the adjustment of the amplitude thereof by the amplitude adjustment circuit 91*a*, and the other of the steering angle sensor output signal and the motor rotational angle signal.

The present embodiment prevents or reduces the change in the sign of the difference between the steering angle sensor output signal and the motor rotational angle signal by increasing or reducing the amplitude(s) of at least one of the steering angle sensor output signal and the motor rotational angle signal. Therefore, the present embodiment can appropriately control the electric motor 40, thereby preventing or reducing the vibration of the steering wheel and improving the steering feeling of the driver.

(2) The steering angle sensor output signal and the motor rotational angle signal have the different sampling cycles from each other.

Since the sampling cycles of these signals are different from each other, acquiring the difference therebetween may lead to a frequent change in the sign. The present embodiment can prevent or reduce the change in the sign of the difference between these signals by increasing or reducing the amplitude(s) of at least one of the signals and thus preventing a magnitude relationship between these signals from frequently changing. Therefore, the present embodiment can appropriately control the electric motor 40, thereby preventing or reducing the vibration of the steering wheel and improving the steering feeling of the driver.

(3) The control apparatus further includes the smoothing circuit 91*b* configured to smooth one of the steering angle sensor output signal and the motor rotational angle signal that corresponds to the longer sampling cycle. The motor control circuit 7*g* is configured to calculate the motor instruction signal based on the signal smoothed by the smoothing circuit 91*b*.

The present embodiment can smooth the change in the signal by smoothing the signal having the long sampling cycle. As a result, the present embodiment can prevent or reduce the unsteadiness (the fluctuation) of the substitute steering torque signal due to the difference between the sampling cycles.

(4) The control apparatus further includes the amplitude readjustment circuit 91*f*. The amplitude adjustment circuit 91*a* functions to increase the amplitude(s) of the steering angle sensor output signal and/or the motor rotational angle signal. The amplitude readjustment circuit 91*f* is configured to reduce the amplitude of the signal acquired as the difference after the difference between the signal subjected to the adjustment of the amplitude thereof by the amplitude adjustment circuit 91*a* and the other signal is calculated.

The present embodiment can control the electric motor 40 based on the signal closer to the characteristic before the amplification and thus improve the steering feeling of the driver by reducing the amplitude of the value acquired by calculating the difference after one or both of the signal(s) is or are amplified.

(5) The amplitude readjustment circuit 91*f* is configured to reduce the amplitude of the signal acquired as the difference at the same rate as the amplification rate employed by the amplitude adjustment circuit 91*a*.

The present embodiment can control the electric motor 40 based on the signal closer to the characteristic before the amplification and thus improve the steering feeling of the driver by reducing the amplitude of the value acquired by calculating the difference between the signals at the same reduction rate as the amplification rate when one or both of the signal(s) is or are amplified.

(6) The power steering apparatus 1 includes the steering mechanism 2 configured to turn the turning target wheel according to the steering operation performed on the steering wheel, and the steering torque sensor 4 (a torque sensor) provided at the steering mechanism 2 and including the torsion bar 41. The steering torque sensor 4 is configured to detect the steering torque generated at the steering mechanism 2 based on the torsional amount of the torsion bar 41. The power steering apparatus 1 further includes the steering angle sensor 5 provided on the steering wheel side of the steering mechanism 2 that is located closer to the steering wheel with respect to the torsion bar 41 and configured to detect the steering angle that is the steering amount of the steering wheel, the electric motor 40 provided on the turning target wheel side of the steering mechanism 2 that is located closer to the turning target wheel with respect to the torsion bar 41 and configured to provide the steering force to the steering mechanism 2, the electronic control unit 7 configured to control the driving of the electric motor 40, and the motor rotational angle sensor 6 provided at the electric motor 40 and configured to detect the rotational angle of the rotor of the electric motor 40. The steering angle sensor output signal is the signal output from the steering angle sensor 5. The main steering angle signal reception portion 7a receives the steering angle sensor output signal. The motor rotational angle signal is the signal output from the motor rotational angle sensor 6. The motor rotational angle signal reception portion 7e receives the motor rotational angle signal. The motor control circuit 7g calculates the motor instruction signal for driving the electric motor 40.

When an abnormality has occurred in the output signal of the steering torque sensor 4, and the substitute value for the output signal of the steering torque sensor 4 is calculated based on the steering angle sensor output signal and the motor rotational angle signal, the present embodiment adjusts the amplitude(s) of the steering angle output signal and/or the motor rotational angle signal, and thus can appropriately control the electric motor 40, thereby preventing or reducing the vibration of the steering wheel and improving the steering feeling of the driver.

(7) The motor control circuit 7g is configured to calculate the substitute value for the output signal of the steering torque sensor 4 based on the difference between the steering angle sensor output signal and the motor rotational angle signal.

Even when an abnormality has occurred in the output signal of the steering torque sensor 4, the present embodiment can continuously perform the steering assist control by calculating the substitute value for the output signal of the steering torque sensor 4 based on the difference between the steering angle sensor output signal and the motor rotational angle signal.

(8) The sampling cycle of the steering angle sensor output signal is longer than the sampling cycle of the motor rotational angle signal. The amplitude adjustment circuit 91a is configured to increase the amplitude of the steering angle sensor output signal.

Since the motor rotational angle signal is updated (sampled) in the middle of one sampling cycle of the steering angle sensor 5, the sign of the value of the difference between the steering angle sensor output signal and the motor rotational angle signal may be frequently switched. Increasing the amplitude of the steering angle sensor output signal can prevent or reduce the switching of the sign of the difference between these signals. Therefore, the present embodiment can appropriately control the electric motor 40, thereby preventing or reducing the vibration of the steering wheel and improving the steering feeling of the driver.

(9) The power steering apparatus 1 includes the steering mechanism 2 configured to turn the turning target wheel according to the steering operation performed on the steering wheel, and the steering torque sensor 4 (a torque sensor) provided at the steering mechanism 2 and including the torsion bar 4. The steering torque sensor 4 is configured to detect the steering torque generated at the steering mechanism 2 based on the torsional amount of the torsion bar 41. The power steering apparatus 1 further includes the steering angle sensor 5 provided on the steering wheel side of the steering mechanism 2 that is located closer to the steering wheel with respect to the torsion bar 41 and configured to detect the steering angle that is the steering amount of the steering wheel, the electric motor 40 provided on the turning target wheel side of the steering mechanism 2 that is located closer to the turning target wheel with respect to the torsion bar 41 and configured to provide the steering force to the steering mechanism 2, the electronic control unit 7 configured to control the driving of the electric motor 40, the motor rotational angle sensor 6 provided at the electric motor 40 and configured to detect the rotational angle of the rotor of the electric motor 40, the main steering torque signal reception portion 7b (a torque signal reception portion) provided at the electronic control unit 7 and configured to receive the torque sensor output signal, which is the detection signal output from the steering torque sensor 4, the main steering angle signal reception portion 7a (a steering signal reception portion) provided at the electronic control unit 7 and configured to receive the steering angle sensor output signal, which is the detection signal output from the steering angle sensor 5, according to the first sampling cycle, the motor rotational angle signal reception portion 7e provided at the electronic control unit 7 and configured to receive the motor rotational angle signal, which is the detection signal output from the motor rotational angle sensor 6, according to the second sampling cycle different from the first sampling cycle, the abnormality detection circuit 7f provided at the electronic control unit 7 and configured to detect an abnormality in the torque sensor output signal, the amplitude adjustment circuit 91a provided at the electronic control unit 7 and configured to increase or reduce the amplitude(s) of the steering angle sensor output signal and/or the motor rotational angle signal, the substitute signal calculation circuit 91 provided at the electronic control unit 7 and configured to calculate the substitute signal for the torque sensor output signal based on at least one of the steering angle sensor output signal and the motor rotational angle signal that is subjected to the adjustment of the amplitude thereof by the amplitude adjustment circuit 91a, and the other of these signals, and the motor control circuit 7g provided at the electronic control unit 7 and configured to output the motor instruction signal for driving the electric motor 40 based on the torque sensor output signal at normal times when no abnormality is detected in the torque sensor output signal by the abnormality detection circuit 7f, and also output the motor instruction signal based on the substitute signal when an abnormality is detected in the torque sensor output signal by the abnormality detection circuit 7f.

When an abnormality has occurred in the output signal of the steering torque sensor 4, and the substitute value for the output signal of the steering torque sensor 4 is calculated based on the steering angle sensor output signal and the motor rotational angle signal, the present embodiment adjusts the amplitude(s) of the steering angle output signal and/or the motor rotational angle signal, and thus can appropriately control the electric motor 40, thereby preventing or reducing the vibration of the steering wheel and improving the steering feeling of the driver.

(10) The steering angle sensor 5 includes the combination of the plurality of gears (the main gear 50, the primary detection gear 51, and the secondary detection gear 52). The power steering apparatus 1 further includes the smoothing circuit 91b configured to smooth the steering angle sensor output signal.

Due to the presence of the backlash in the combination of the plurality of gears, this configuration leads to occurrence of the non-response time period during which the signal fails to change when the steering wheel is steered in an opposite direction to change the steering direction. The present embodiment can smooth the change in the signal including the non-response time period and thus eliminate or reduce the influence of the non-response time period by performing the smoothing processing on the output signal of the steering angle sensor 5 including the plurality of gears.

(11) The power steering apparatus 1 further includes the speed reducer provided between the steering mechanism 2 and the electric motor 40 and including the ball screw mechanism 26 configured to transmit the rotational force of the electric motor 40 to the steering mechanism 2.

The speed reduction rate of the ball screw mechanism 26 is high compared to other types of speed reducers. Therefore, this configuration leads to an increase in the difference between the sampling cycles of the steering angle sensor 5 and the motor rotational angle sensor 6. The present embodiment can prevent or reduce the deterioration of the steering feeling based on the difference between the sampling cycles by adjusting the amplitude(s) of the steering angle sensor output signal and/or the motor rotational angle signal, and this effect is more significant than the power steering apparatus 1 using another type of speed reducer.

(12) The steering angle sensor output signal and the motor rotational angle signal have the different sampling cycles from each other.

Since the sampling cycles of these signals are different from each other, acquiring the difference therebetween may lead to a frequent change in the sign. The present embodiment can prevent or reduce the change in the sign of the difference between these signals by increasing or reducing the amplitude(s) of at least one of the signals and thus preventing the magnitude relationship between these signals from frequently changing. Therefore, the present embodiment can appropriately control the electric motor 40, thereby preventing or reducing the vibration of the steering wheel and improving the steering feeling of the driver.

(13) The power steering apparatus 1 further includes the smoothing circuit 91*b* provided at the electronic control unit 7 and configured to smooth the signal corresponding to the longer one of the first sampling cycle and the second sampling cycle. The substitute signal calculation circuit 91 is configured to calculate the substitute signal based on the signal smoothed by the smoothing circuit 91*b*.

The present embodiment can smooth the change in the signal by smoothing the signal having the long sampling cycle. As a result, the present embodiment can prevent or reduce the unsteadiness (the fluctuation) of the substitute steering torque signal due to the difference between the sampling cycles.

Second Embodiment

In the first embodiment, the electric motor 40 is controlled based on the difference between the steering angle sensor output signal of the steering angle sensor 5 and the pinion rotational angle signal acquired based on the motor rotational angle signal of the motor rotational angle sensor 6 of the power steering apparatus 1. A second embodiment is different from the first embodiment in that a damping force variable actuator 66 is controlled based on a difference between a sprung acceleration signal and an unsprung acceleration signal of a suspension 60 that variably controls a damping force.

Figure 17:
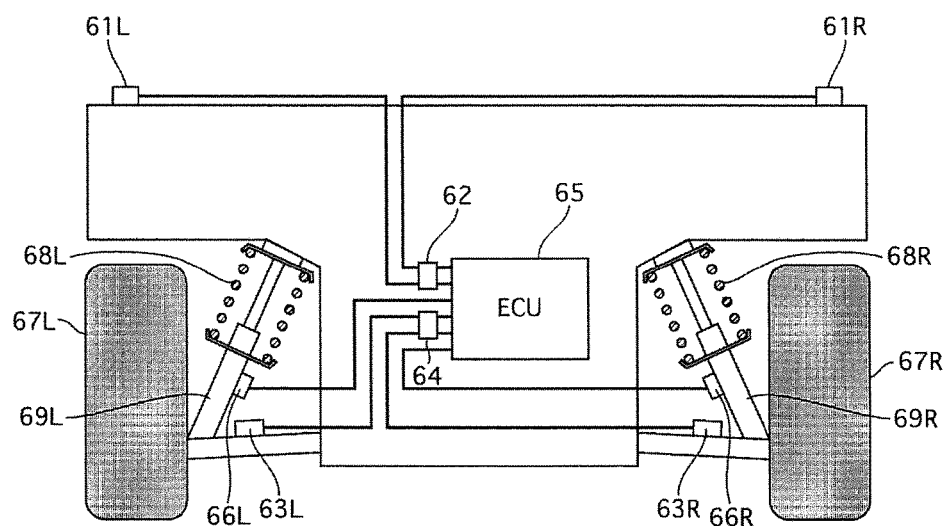
FIG. 17 is a schematic view of a suspension including a damping force variable actuator according to a second embodiment.

FIG. 17 is a schematic view of the suspension 60 including the damping force variable actuator 66. Wheels 67L and 67R are suspended from a vehicle body via suspensions 60 including springs 68L and 68R and shock absorbers 69L and 69R, respectively.

Damping forces of the shock absorbers 69L and 69R are variably controlled by damping force variable actuators 66L and 66R, respectively. The damping force variable actuators 66L and 66R are controlled by an electronic control unit 65. This configuration contributes to improvement of a ride comfort and operation stability.

Sprung acceleration sensors 61L and 61R are provided on the vehicle body side. The sprung acceleration sensors 61L and 61R detect vertical accelerations of the vehicle body. Unsprung acceleration sensors 63L and 63R are provided on a wheel side where the wheels 67L and 67R are mounted, respectively. The unsprung acceleration sensors 63L and 63R detect vertical accelerations of the wheels 67L and 67R, respectively. The sprung acceleration sensors 61L and 61R output the detected vertical accelerations of the vehicle body to the electronic control unit 65 via a sprung acceleration signal reception unit 62 as sprung acceleration signals. The unsprung acceleration sensors 63L and 63R output the detected vertical accelerations of the wheels 67L and 67R to the electronic control unit 65 via an unsprung acceleration signal reception portion 64 as unsprung acceleration signals.

The sprung acceleration sensors 61L and 61R and the unsprung acceleration sensors 63L and 63R operate based on the same sampling cycles but based on different sampling timings from each other.

The electronic control unit 65 calculates each of displacement speeds of the shock absorbers 69L and 69R by integrating the difference between the sprung acceleration signal and the unsprung acceleration signal. The electronic control unit 65 controls the damping forces of the shock absorbers 69L and 69R by the damping force variable actuators 66L and 66R based on the displacement speeds of the shock absorbers 69L and 69R, respectively.

Unlike the steering angle sensor 5 and the motor rotational angle sensor 6 according to the first embodiment, the sampling cycles of the sprung acceleration sensors 61L and 61R and the unsprung acceleration sensors 63L and 63R are the same as each other. However, the sampling timings thereof are different from each other. Since the sampling timings are different from each other, during one sampling cycle of one of the sensors, a value of another sensor is updated. Therefore, when the difference between the sprung acceleration signal and the unsprung acceleration signal is small, the signal may exhibit hunting between a positive value and a negative value across the zero point. According thereto, the damping force variable actuators 66L and 66R may engage in unnecessary control, resulting in deterioration of the ride comfort and the operation stability.

Similarly to the first embodiment, for example, the second embodiment increases an amplitude of the sprung acceleration signal, calculates a difference between the sprung acceleration signal with the amplitude thereof increased and the unsprung acceleration signal, reduce the difference therebetween at the same rate as the rate employed when the amplitude of the sprung acceleration signal is increased, and set a result thereof as a displacement acceleration of each of the shock absorbers 69L and 69R. The electronic control unit 65 can calculate the displacement speeds by integrating the displacement accelerations of the shock absorbers 69L and 69R, and control the damping forces of the shock absorbers 69L and 69R by the damping force variable actuators 66L and 66R, respectively. As a result, the damping force variable actuators 66L and 66R can be prevented from engaging in unnecessary control, which can improve the ride comfort and the operation stability.

Advantageous Effects

(14) In the control apparatus for the suspension 60, the sprung acceleration signal reception portion 62 (the first output signal reception portion) receives the sprung acceleration signal (the first output signal) of the sprung acceleration sensor 61 (a first acceleration sensor) mounted on the vehicle side. The unsprung acceleration signal reception portion 64 (the second output signal reception portion) receives the unsprung acceleration signal (the second output signal) of the unsprung acceleration sensor 63 (a second acceleration sensor) mounted on the wheel side. The electronic control unit 65 (the driving signal calculation circuit) is configured to calculate the instruction signal for the damping force variable actuator 66 (the actuator) configured to control the driving of the suspension 60.

The present embodiment can appropriately control the damping force variable actuator 66 and thus improve the ride comfort and the operation stability by adjusting the amplitude(s) of the sprung acceleration signal and/or the unsprung acceleration signal.

(15) The sprung acceleration signal and the unsprung acceleration signal have the same sampling cycles as each other and the different sampling timings from each other.

Even when the sampling cycles are the same as each other, the difference between the sampling timings may lead to hunting between a positive value and a negative value across the zero point when the difference between these signals is acquired. The present embodiment can appropriately control the damping force variable actuator 66 and thus improve the ride comfort and the operation stability by adjusting the amplitude(s) of the sprung acceleration signal and/or the unsprung acceleration signal.

Third Embodiment

In the first embodiment, the electric motor 40 is controlled based on the difference between the steering angle sensor output signal of the steering angle sensor 5 and the pinion rotational angle signal acquired based on the motor rotational angle signal of the motor rotational angle sensor 6 of the power steering apparatus 1. A third embodiment is different from the first embodiment in that an electric motor 103 for driving a pump apparatus 104 is controlled based on a difference between a master hydraulic signal and a wheel hydraulic signal of a braking apparatus 100 that controls a braking force with use of a brake caliper 105.

Figure 18:
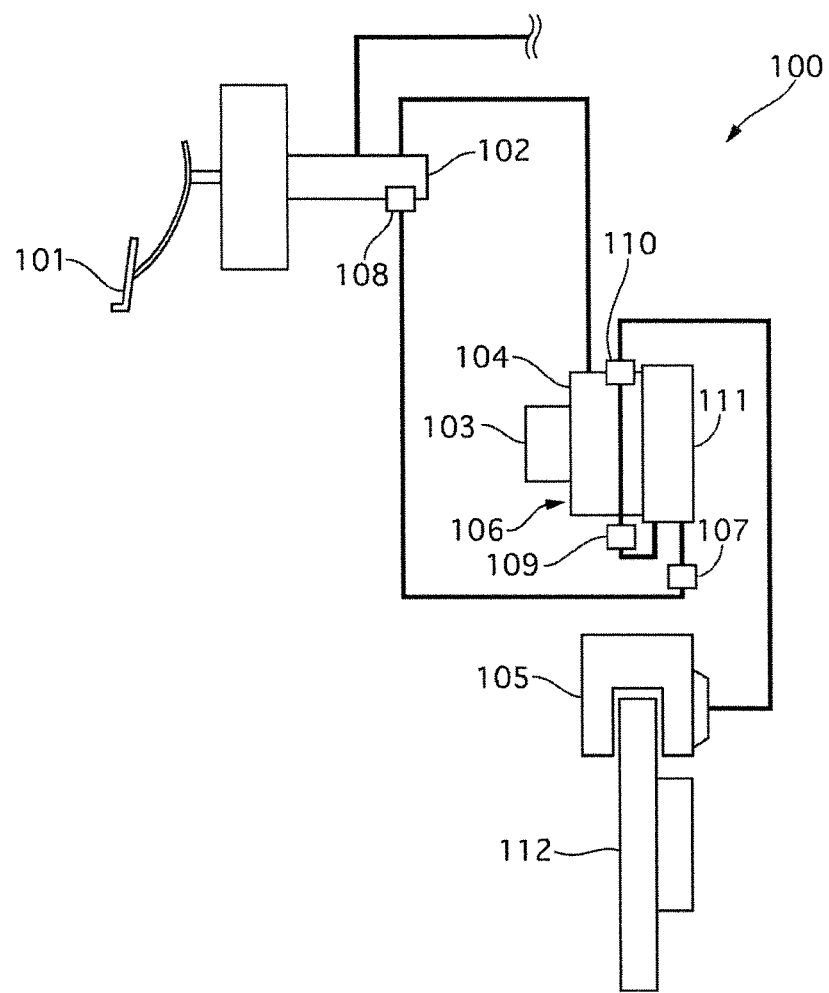
FIG. 18 is a schematic view of a control apparatus according to a third embodiment.

FIG. 18 is a schematic view of the braking apparatus 100. The braking apparatus 100 is configured in such a manner that brake fluid is supplied from a master cylinder 102 to the brake caliper 105 by an operation of the driver on a brake pedal 101. The braking apparatus 100 includes the pump apparatus 104, which is driven by the electric motor 103 independently of the master cylinder 102 as a hydraulic generation source.

A hydraulic actuator 106 includes a solenoid valve that switches closing/opening of the pump apparatus 104 and each brake fluid circuit. The electric motor 103 and the solenoid valve are controlled according to an instruction signal issued by an actuator control portion 111. An amount of the brake fluid to be supplied to the brake caliper 105 is controlled by adjusting a driving amount of the pump apparatus 104 and a valve-opening amount of the solenoid valve.

A master pressure sensor 108 is provided at the master cylinder 102. The master pressure sensor 108 detects a hydraulic pressure in the master cylinder 102. A wheel pressure sensor 110 is provided at the hydraulic actuator 106. The wheel pressure sensor 110 detects a hydraulic pressure in the hydraulic actuator 106. The master pressure sensor 108 outputs the detected hydraulic pressure in the master cylinder 102 to the actuator control portion 111 via a master pressure signal reception portion 107 as a master pressure signal. The wheel pressure sensor 110 outputs the detected hydraulic pressure in the hydraulic actuator 106 to the actuator control portion 111 via a wheel pressure signal reception portion 109 as a wheel pressure signal.

The master pressure sensor 108 and the wheel pressure sensor 110 operate based on the same sampling cycles as each other but based on different sampling timings from each other.

The actuator control portion 111 controls the hydraulic actuator 106 based on the difference between the master pressure signal and the wheel pressure signal, and controls an increase or a reduction in the hydraulic pressure of the brake fluid to be supplied from the hydraulic actuator 106 to the brake caliper 105.

Unlike the steering angle sensor 5 and the motor rotational angle sensor 6 according to the first embodiment, the sampling cycles of the master pressure sensor 108 and the wheel pressure sensor 110 are the same as each other. However, the sampling timings thereof are different from each other. Since the sampling timings are different from each other, during one sampling cycle of one of the sensors, a value of another sensor is updated. Therefore, when the difference between the master pressure signal and the wheel pressure signal is small, the signal may exhibit hunting between a positive value and a negative value across the zero point. According thereto, the electric motor 103 may engage in unnecessary control, resulting in deterioration of a behavior of the vehicle.

Similarly to the first embodiment, for example, the third embodiment increases an amplitude of the master pressure signal, calculates a difference between the master pressure signal with the amplitude thereof increased and the wheel pressure signal, reduce the difference therebetween at the same rate as the rate employed when the amplitude of the master pressure signal is increased, and set a result thereof as a differential pressure. The actuator control portion 111 can adjust a driving amount of the electric motor 103 according to the differential pressure, and control the braking force by the brake caliper 105. As a result, the behavior of the vehicle can be stabilized.

Advantageous Effects

(16) The control apparatus for the braking apparatus 100 includes the master cylinder 102 configured to increase the hydraulic pressure according to the operation performed on the brake pedal 101, and the hydraulic actuator 106 including the pump apparatus 104 configured to be driven by the electric motor 30 and configured to control the brake caliper 105. The master pressure signal reception portion 107 (the first output signal reception portion) receives the master hydraulic signal (the first output signal) of the master pressure sensor 108 configured to detect the hydraulic pressure in the master cylinder 102. The wheel pressure signal reception portion 109 (the second output signal reception portion) receives the wheel hydraulic signal (the second output signal) of the wheel pressure sensor 110 configured to detect the hydraulic pressure in the hydraulic actuator 106. The actuator control portion 111 (the driving signal calculation circuit) is configured to calculate the motor instruction signal for driving the electric motor 103 based on the difference between the master hydraulic signal and the wheel hydraulic signal.

The present embodiment can appropriately control the electric motor 103 and thus stabilize the behavior of the vehicle by adjusting the amplitude(s) of the master pressure signal and/or the wheel pressure signal.

Other Embodiments

Having described the present invention based on the first to third embodiments, the specific configuration of each invention is not limited to the first to third embodiments, and the present invention also includes a design modification and the like thereof made within a range that does not depart from the spirit of the present invention.

In the first embodiment, the control apparatus is configured to increase the amplitude of the steering angle sensor output signal detected by the steering angle sensor 5 that operates based on a longer sampling cycle than the motor rotational angle sensor 6. Then, the control apparatus is configured to acquire the difference between the amplified steering angle sensor output signal and the pinion rotational angle signal acquired from the motor rotational angle signal detected by the motor rotational angle sensor 6. This configuration may be modified so as to increase the amplitude of the pinion rotational angle signal and acquire a difference between the amplified pinion rotational angle signal and the steering angle sensor output signal.

In the first embodiment, the control apparatus is configured to increase the amplitude of the steering angle sensor output signal, but may be configured to reduce the amplitude of the steering angle output signal.

In the first embodiment, only the amplitude of the steering angle sensor output signal is increased, but the amplitude of the pinion rotational angle signal also may be increased. In this case, similar effects can be achieved by employing different rates as the increase rate of the amplitude of the steering angle sensor output signal and the increase rate of the amplitude of the pinion rotational angle signal. Both the amplitude of the steering angle sensor output signal and the amplitude of the pinion rotational angle signal may be reduced.

In the first embodiment, the sampling cycle of the steering angle sensor 5 is longer than the sampling cycle of the motor rotational angle sensor 6, but the sampling cycles thereof may be the same as each other as long as the sampling timings thereof are different from each other.

In the second embodiment, the sprung acceleration sensors 61L and 61R and the unsprung acceleration sensors 63L and 63R operate based on the same sampling cycles as each other but based on the different sampling timings from each other. The sprung acceleration sensors 61L and 61R and the unsprung acceleration sensors 63L and 63R may operate based on different sampling cycles from each other. Similarly, the master pressure sensor 108 and the wheel pressure sensor 110 according to the third embodiment may operate based on different sampling cycles from each other.

The invention claimed is:

1. A power steering apparatus comprising:
   a steering mechanism configured to turn a turning target wheel according to a steering operation performed on a steering wheel;
   a torque sensor provided at the steering mechanism and including a torsion bar, the torque sensor being configured to detect a steering torque generated at the steering mechanism based on a torsional amount of the torsion bar;
   a steering angle sensor provided on the steering wheel side of the steering mechanism with respect to the torsion bar, the steering angle sensor being configured to detect a steering angle that is a steering amount of the steering wheel;
   an electric motor provided on the turning target wheel side of the steering mechanism with respect to the torsion bar, the electric motor being configured to provide a steering force to the steering mechanism;
   an electronic control unit configured to control driving of the electric motor;
   a motor rotational angle sensor provided at the electric motor and configured to detect a rotational angle of a rotor of the electric motor;
   a torque signal reception portion provided at the electronic control unit and configured to receive a torque sensor output signal, which is a detection signal output from the torque sensor;
   a steering signal reception portion provided at the electronic control unit and configured to receive a steering angle sensor output signal, which is a detection signal output from the steering angle sensor, according to a first sampling cycle;
   a motor rotational angle signal reception portion provided at the electronic control unit and configured to receive a motor rotational angle signal, which is a detection signal output from the motor rotational angle sensor, according to a second sampling cycle different from the first sampling cycle;
   an abnormality detection circuit provided at the electronic control unit and configured to detect an abnormality in the torque sensor output signal;
   an amplitude adjustment circuit provided at the electronic control unit and configured to increase or reduce an amplitude or amplitudes of the steering angle sensor output signal and/or the motor rotational angle signal;
   a substitute signal calculation circuit provided at the electronic control unit and configured to calculate a substitute signal for the torque sensor output signal based on at least one of the steering angle sensor output signal and the motor rotational angle signal that is subjected to the adjustment of the amplitude thereof by the amplitude adjustment circuit, and the other of these signals; and
   a motor control circuit provided at the electronic control unit and configured to output a motor instruction signal for driving the electric motor based on the torque sensor output signal at normal times when no abnormality is detected in the torque sensor output signal by the abnormality detection circuit, and also output the motor instruction signal based on the substitute signal when an abnormality is detected in the torque sensor output signal by the abnormality detection circuit.

2. The power steering apparatus according to claim 1, wherein the sampling cycle of the steering angle sensor output signal is longer than the sampling cycle of the motor rotational angle signal, and
   wherein the amplitude adjustment circuit increases the amplitude of the steering angle sensor output signal.

3. The power steering apparatus according to claim 2, wherein the steering angle sensor includes a combination of a plurality of gears, and wherein the power steering apparatus further comprises a smoothing circuit configured to smooth the steering angle sensor output signal.

4. The power steering apparatus according to claim 2, further comprising an amplitude readjustment circuit, wherein the amplitude readjustment circuit reduces an amplitude of a signal acquired as a difference after the difference between the signal subjected to the adjustment of the amplitude thereof by the amplitude adjustment circuit and the other signal is calculated.

5. The power steering apparatus according to claim 1, further comprising a speed reducer provided between the steering mechanism and the electric motor, the speed reducer including a ball screw mechanism configured to transmit a rotational force of the electric motor to the steering mechanism.

6. The power steering apparatus according to claim 1, wherein the steering angle sensor output signal and the motor rotational angle signal have different sampling cycles from each other.

7. The power steering apparatus according to claim 6, further comprising a smoothing circuit provided at the electronic control unit and configured to smooth a signal corresponding to longer one of the first sampling cycle and the second sampling cycle, wherein the substitute signal calculation circuit calculates the substitute signal based on the signal smoothed by the smoothing circuit.

\* \* \* \* \*